(12) United States Patent
Ishizuka et al.

(10) Patent No.: US 11,926,744 B2
(45) Date of Patent: Mar. 12, 2024

(54) INK COMPOSITION FOR PLASMA CURING AND ADDITIVE FOR INK COMPOSITIONS FOR PLASMA CURING

(71) Applicant: SAKATA INX CORPORATION, Osaka (JP)

(72) Inventors: Takashi Ishizuka, Osaka (JP); Yasutsugu Mochizuki, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 531 days.

(21) Appl. No.: 17/270,300

(22) PCT Filed: Aug. 20, 2019

(86) PCT No.: PCT/JP2019/032337
§ 371 (c)(1),
(2) Date: Feb. 22, 2021

(87) PCT Pub. No.: WO2020/045151
PCT Pub. Date: Mar. 5, 2020

(65) Prior Publication Data
US 2021/0340392 A1 Nov. 4, 2021

(30) Foreign Application Priority Data
Aug. 28, 2018 (JP) .................... 2018-159807

(51) Int. Cl.
| C08F 2/46 | (2006.01) |
| C08F 2/50 | (2006.01) |
| C08G 61/04 | (2006.01) |
| C09D 11/037 | (2014.01) |
| C09D 11/06 | (2006.01) |
| C09D 11/103 | (2014.01) |
| C09D 11/322 | (2014.01) |
| C09D 191/00 | (2006.01) |

(52) U.S. Cl.
CPC ............ *C09D 11/06* (2013.01); *C09D 11/037* (2013.01); *C09D 11/103* (2013.01); *C09D 11/322* (2013.01); *C09D 191/00* (2013.01)

(58) Field of Classification Search
CPC ..... C09D 11/322; C09D 11/06; C09D 11/037; C09D 11/103; C09D 11/101; C09D 191/00
USPC ................. 522/66, 6, 189, 184, 71, 1; 520/1
See application file for complete search history.

(56) References Cited

U.S. PATENT DOCUMENTS

| 3,939,126 A | 2/1976 | Carder et al. |
| 8,003,169 B2 | 8/2011 | Misev et al. |
| 2005/0061205 A1 | 3/2005 | Kobayashi et al. |
| 2005/0129859 A1* | 6/2005 | Misev ............... B05D 3/147 427/535 |
| 2011/0143051 A1* | 6/2011 | Ohashi ............... C09D 11/0235 252/512 |
| 2015/0065340 A1 | 3/2015 | Hatakeyama et al. |
| 2019/0359835 A1 | 11/2019 | Hishinuma et al. |

FOREIGN PATENT DOCUMENTS

| CN | 1646572 A | 7/2005 |
| EP | 1160259 A1 | 12/2001 |
| EP | 3569664 A1 | 11/2019 |
| EP | 3730557 A1 | 10/2020 |
| EP | 3730557 | * 11/2021 |
| JP | S5152494 A | 5/1976 |
| JP | 2001075281 A | 3/2001 |
| JP | 2004195835 | * 7/2004 |
| JP | 2004195835 A | 7/2004 |
| JP | 2005523803 A | 8/2005 |
| JP | 2007054987 A | 3/2007 |
| JP | 2007106105 A | 4/2007 |
| JP | 2007332166 A | 12/2007 |
| JP | 2008012919 A | 1/2008 |
| JP | 2008297506 A | 12/2008 |
| JP | 2013010933 A | 1/2013 |
| JP | 2013129123 A | 7/2013 |
| JP | 2014015572 A | 1/2014 |
| JP | 2015140390 A | 8/2015 |
| WO | 03089479 A2 | 10/2003 |
| WO | 2003089479 | * 10/2003 |
| WO | 2006035679 A1 | 4/2006 |
| WO | 2018131666 A1 | 7/2018 |
| WO | 2019123915 A1 | 6/2019 |

OTHER PUBLICATIONS

Jung et al., WO 2003089479 Machine Translation, Oct. 30, 2003 (Year: 2003).*
Ishikawa, JP 2004-195835 Machine Translation, Jul. 15, 2004 (Year: 2004).*
Shahna et al., Cholorbenzene degradation by non-thermal plasma combined with EG—TiO2/ZnO as a photocatalyst: Effect of photocatalyst on CO2 selectivity and byproducts reduction, Nov. 9, 2016 (Year: 2016).*
Ishizuka et al., EP 3730557 Machine Translation, Nov. 10, 2021 (Year: 2021).*

(Continued)

*Primary Examiner* — Jessica Whiteley

(74) *Attorney, Agent, or Firm* — Law Office of Katsuhiro Arai

(57) ABSTRACT

An object is to provide a printing ink that has high environmental friendliness and is excellent in quick dry-curability of a coating when a plasma is used as a curing system. A solution is to provide an ink composition for plasma curing including a photocatalyst compound and/or a composite of a metal component and a photocatalyst compound and to provide an additive for an ink composition for plasma curing, the additive including a photocatalyst compound and/or a composite of a metal component and a photocatalyst compound.

3 Claims, No Drawings

(56) References Cited

OTHER PUBLICATIONS

Notification Concerning Transmittal of International Preliminary Report on Patentability (PCT/IB/326) and Notification of Transmittal of Copies of Translation of the International Preliminary Report on Patentability (PCT/IB/338) dated Mar. 11, 2021, with International Preliminary Report on Patentability (PCT/IB/373) and Written Opinion of the International Searching Authority (PCT/ISA/237), for corresponding international application PCT/JP2019/032337 (16 pages).
A First Office Action issued by the State Intellectual Property Office of China dated Apr. 12, 2022, for Chinese counterpart application No. 201980055023.3 (7 pages).
Xue, Production and Photocatalytic Applications of Highly Dispersed Nanocatalysts, Metallurgical Industry Press, Sep. 2017, 1st edition, p. 9-11, lines 1-2 (5 pages).
Extended European Search Report (EESR) dated Apr. 8, 2022, issued for European counterpart patent application No. EP19853756.5 (10 pages).
International Search Report (ISR) dated Nov. 5, 2019, issued for International application No. PCT/JP2019/032337. (2 pages).

* cited by examiner

INK COMPOSITION FOR PLASMA CURING AND ADDITIVE FOR INK COMPOSITIONS FOR PLASMA CURING

CROSS-REFERENCE TO RELATED APPLICATIONS

This application is the U.S. National Phase under 35 U.S.C. § 371 of International Application PCT/JP2019/032337, filed Aug. 20, 2019, which claims priority to Japanese Patent Application No. JP2018-159807, filed Aug. 28, 2018. The International Application was published under PCT Article 21(2) in a language other than English.

TECHNICAL FIELD

The present invention relates to an ink composition for plasma curing including "a photocatalyst compound and/or a composite of a metal component and a photocatalyst compound" and an additive for an ink composition for plasma curing, the additive including "a photocatalyst compound and/or a composite of a metal component and a photocatalyst compound".

BACKGROUND ART

Typical printing methods currently used include offset printing, gravure printing, flexographic printing, screen printing, and inkjet printing. Of these, offset printing is mainly used when printed materials are quickly printed in large amounts.

A printed material obtained by printing need to be in a state where an ink composition deposited on a surface thereof is sufficiently dry-cured and fixed. If unfixed, off-setting may occur when the printed material is stacked on another printed material, or the ink may adhere to a finger when the printed material is touched, in which case the printed material cannot be sent to a post process or put into the market. For this reason, after printing is performed, a step of dry-curing the ink composition deposited on the surface of the printed material to be fixed to the substrate surface is required.

Here, it is known that as a means for dry-curing an ink composition deposited on a surface of a printed material to be fixed to a substrate surface, any of the four methods: evaporation, penetration, oxidative polymerization, and photopolymerization is mainly used according to the ink composition. For example, mainstream systems for dry-curing and fixing an ink coating in offset printing are penetration drying typically used for newspaper printing, oxidative polymerization typically used for sheet-fed printing, photocuring with ultraviolet (UV) or the like, and evaporation drying typically used for offset rotary printing. In addition, to address energy saving and environmental impact, new dry-curing systems such as LED curing and energy beam (EB) curing have also been developed as applications of photocuring.

The method of dry-curing and fixing an ink composition by evaporation uses a mineral oil, which is a volatile component, as a solvent component. This method provides relatively high productivity, but due to the use of a large amount of mineral-based raw material, the biomass content is low, and there is a concern about safety because the environmental impact caused by a release of VOC (volatile organic compound) into the atmosphere is high.

The method of drying and fixing an ink composition by penetration is a method of achieving surface dryness by allowing an oil component included in the ink composition deposited on a surface of a printed material to penetrate into the printed material. This method can achieve a dry state relatively fast, but due to the need for a solvent to rapidly penetrate into paper, the paper is limited to, for example, woody paper. Thus, the method is not suitable for printing requiring high aesthetic properties.

From this viewpoint, the method of dry-curing and fixing an ink composition by oxidative polymerization or photo-polymerization tends to be employed when a printed material required to have high aesthetic properties is obtained.

For example, the ink composition used for the method of performing dry-curing and fixing by oxidative polymerization includes, as an oil component, a plant-based unsaturated oil having a high iodine value, such as linseed oil. Oxygen in the air causes the unsaturated oil to undergo oxidative polymerization to form a non-sticky (i.e., dried) film. This ink composition can include a large amount of plant-based raw material to increase the biomass content. In addition, by allowing the oil component to penetrate into a printed material, the release of VOC components into the atmosphere can be suppressed, and the printed material having aesthetic properties can be obtained with low environmental impact.

However, such a chemical reaction in which an unsaturated oil is oxidatively polymerized requires a relatively long time and thus is poor in quick-drying properties, which may cause a problem due to poor drying and fixing of an ink composition.

Against this background, printing using a photopolymerization method, in which an ink composition is dry-cured and fixed by irradiating a printed material that has been printed with light such as ultraviolet light, has been actively performed in recent years. The main ink composition used in this method includes a monomer or an oligomer having an ethylenically unsaturated bond and a photopolymerization initiator that generates radicals upon irradiation with light such as ultraviolet light. By applying light such as ultraviolet light after printing, radical polymerization instantaneously occurs to form a non-sticky (i.e., dried) film, and a large amount VOC will not be released in into the atmosphere.

However, the ink composition used in the photopolymerization method cannot increase the biomass content, and there are concerns about environmental impact and safety, such as the potential of residual monomer in the printed material. Since the environmental and safety regulations will become increasingly stringent, the use of monomers and photopolymerization initiators will probably also be regulated in the future.

Under such circumstances, various proposals have hitherto been made.

PTL 1 describes, as a new method for drying and fixing an oxidative polymerizable oil-based ink, a method using ions generated using an atmospheric-pressure plasma. This is a proposal to promote, by the ions, oxygen radical cross-linking polymerization of a non-volatile sheet-fed offset ink used in sheet-fed offset printing to achieve a short drying and fixing time. In EXAMPLES, it is disclosed that an oxidative polymerizable oil-based ink (TK HIGH-ECO NV100 manufactured by Toyo Ink Manufacturing Co., Ltd.) containing no volatile organic compounds is brought into contact with anions generated using an atmospheric-pressure plasma. However, it is not disclosed that a photocatalyst compound and/or a composite of a metal component and a photocatalyst compound is used as a component of an ink composition. On the other hand, this method requires a time of minutes until achieving drying and fixing and is disadvantageous in terms of quick-drying properties, and thus is difficult to apply to quick printing in large amounts.

PTL 2 proposes an image fixing method including the steps of recording an image on a recording medium by using a recording agent including a component that cures upon plasma treatment and fixing the image to the recording medium by performing a plasma treatment on the image. In EXAMPLES, it is disclosed that a printed image is formed using an offset ink including carbon black, a rosin-modified phenolic resin, linseed oil, a high-boiling petroleum solvent, and a drier or an ink-jet ink including a dye, a styrene-acrylic acid-ethyl acrylate copolymer, glycerol, ethylene glycol, and a surfactant, and the image is fixed by plasma irradiation. However, it is not disclosed that a photocatalyst compound and/or a composite of a metal component and a photocatalyst compound is used as a component of an ink composition.

PTL 3 describes that various inks for printing that may include alkyds that dry oxidatively are cured in a plasma discharge chamber. However, it is not specified what type of ink is particularly used.

PTL 4 describes that a steel sheet is coated with a radiation curable composition including a urea-urethane oligomer, an acrylic compound, and a photoinitiator, and the coating is exposed to a series of beams from an argon vortex plasma arc for 0.6 seconds to cure. However, the biomass content is low, and it is not disclosed that a photocatalyst compound and/or a composite of a metal component and a photocatalyst compound is used as a component of an ink composition.

PTL 5 describes an ink fixing method including an ink fixing step of fixing a printing ink including at least a non-volatile organic compound having a carboxyl group and including no photopolymerization initiators to a substrate by using an interelectrode discharge at or near the atmospheric pressure. However, the biomass content is low, and it is not disclosed that a photocatalyst compound and/or a composite of a metal component and a photocatalyst compound is used as a component of an ink composition.

PTL 6 describes an image forming method including disposing a composition including at least one of a polymerization initiator and a chain transfer agent, at least one radical polymerizable compound, and an ink containing at least one color material on a surface of a substrate in an image pattern and irradiating the composition with a plasma to form an image formed of a plasma polymerized film. However, the biomass content is low, and it is not disclosed that a photocatalyst compound and/or a composite of a metal component and a photocatalyst compound is used as a component of an ink composition.

PTL 7 describes an ink fixing method including at least an ink fixing step of fixing an ink on a substrate to the substrate by using an interelectrode discharge at or near the atmospheric pressure, wherein the ink includes at least polyvinylpyrrolidone. However, the biomass content is low, and it is not disclosed that a photocatalyst compound and/or a composite of a metal component and a photocatalyst compound is used as a component of an ink composition.

PTL 8 describes a printed material obtained by printing a printing ink on a sheet of printing paper and further performing a surface treatment on the printed surface, wherein (1) the printing ink contains a rosin resin, and (2) the surface treatment is a corona treatment, a frame treatment, or a plasma treatment, and the treated printed material has a surface specific resistance at or lower than a particular value. However, EXAMPLES only describe that a plasma treatment is performed on a printed material obtained by performing printing using an ink including an organic solvent and storing the resultant for 24 hours. It cannot be said that the plasma treatment (plasma irradiation) is performed for the purpose of dry-curing and fixing the printing ink. Also, it is not disclosed that a photocatalyst compound and/or a composite of a metal component and a photocatalyst compound is used as a component of an ink composition.

CITATION LIST

Patent Literature

PTL 1: Japanese Unexamined Patent Application Publication No. 2007-54987
PTL 2: Japanese Unexamined Patent Application Publication No. 2008-12919
PTL 3: Japanese Unexamined Patent Application Publication (Translation of PCT Application) No. 2005-523803
PTL 4: Japanese Unexamined Patent Application Publication No. 51-52494
PTL 5: Japanese Unexamined Patent Application Publication No. 2007-106105
PTL 6: Japanese Unexamined Patent Application Publication No. 2013-10933
PTL 7: Japanese Unexamined Patent Application Publication No. 2008-297506
PTL 8: Japanese Unexamined Patent Application Publication No. 2015-140390

SUMMARY OF INVENTION

Technical Problem

The present invention has been made in view of the above circumstances, and an object thereof is to provide an ink composition for plasma curing that can achieve an early dry-curing start time and is also excellent in dry-curability of an ink composition film.

Another object of the present invention is to provide an additive for an ink composition for plasma curing, which additive can make the dry-curing start time of the ink composition for plasma curing early and also improves the dry-curability of an ink composition film.

A further object is to construct a printing system that need not contain a volatile organic solvent (VOC) or the like and has low environmental impact, high safety, and a high biomass content.

Solution to Problem

The present inventors have found that irradiating a printed film of an ink composition for plasma curing including photocatalyst titanium oxide with a plasma makes the dry-curing start time early and also improves the dry-curability of the ink composition film and previously filed a patent application.

To solve the problems described above, the present inventors have conducted intensive studies and found that irradiating a printed film of an ink composition for plasma curing including a photocatalyst compound and/or a composite of a metal component and a photocatalyst compound with a plasma makes the dry-curing start time earlier and also improves the dry-curability of the ink composition film.

In particular, even if the ink composition for plasma curing includes an animal or vegetable oil and/or an animal or vegetable oil derivative or is oxidative polymerizable, the presence of a photocatalyst compound and/or a composite of a metal component and a photocatalyst compound makes the dry-curing start time earlier and further improves the dry-curability of the film. As a result, it has been found that a printing system that discharges no volatile organic solvents, that has low environmental impact, high safety, and a high biomass content, and that uses an ink composition for plasma curing can be constructed.

The present invention has been completed on the basis of these findings and is specifically as described below.

(1) An ink composition for plasma curing, including a photocatalyst compound and/or a composite of a metal component and a photocatalyst compound.

(2) The ink composition for plasma curing according to (1), wherein the photocatalyst compound includes titanium oxide and/or zinc oxide.

(3) The ink composition for plasma curing according to (1) or (2), wherein the metal component includes one or more selected from a metal, a metal oxide, and a metallic soap.

(4) The ink composition for plasma curing according to any one of (1) to (3), further including a binder.

(5) The ink composition for plasma curing according to any one of (1) to (4), further including an animal or vegetable oil and/or an animal or vegetable oil derivative.

(6) The ink composition for plasma curing according to (5), wherein the animal or vegetable oil and/or the animal or vegetable oil derivative is an animal or vegetable oil and/or an animal or vegetable oil derivative having an iodine value of 80 or more.

(7) An additive for an ink composition for plasma curing, the additive including a photocatalyst compound and/or a composite of a metal component and a photocatalyst compound.

Advantageous Effects of Invention

The present invention provides a highly reactive ink composition for plasma curing. When plasma irradiation is used as a means of dry-curing the ink composition, an earlier dry-curing start time can be achieved, and the dry-curability of an ink composition film is further improved.

The present invention also provides an additive for an ink composition for plasma curing. When plasma irradiation is used as a means of dry-curing the ink composition for plasma curing, the additive can make the dry-curing start time of the ink composition earlier and further improve the dry-curability of an ink composition film.

As a result, a printing system that discharges no volatile organic solvents, that has low environmental impact, high safety, and a high biomass content, and that uses an ink composition for plasma curing can be constructed.

DESCRIPTION OF EMBODIMENTS

Hereinafter, embodiments of an ink composition for plasma curing and an additive for an ink composition for plasma curing according to the present invention will be described. It should be noted that the present invention is not limited to the following embodiments and can be practiced with modification within the scope of the present invention.

The ink composition for plasma curing according to the present invention includes a photocatalyst compound and/or a composite of a metal component and a photocatalyst compound. In addition, the ink composition may include a binder, an animal or vegetable oil and/or an animal or vegetable oil derivative, and/or a conjugated polyene compound, and may further include other components such as liquid components and various additives.

The additive for an ink composition for plasma curing according to the present invention includes a photocatalyst compound and/or a composite of a metal component and a photocatalyst compound. In addition, the additive may include a binder, an animal or vegetable oil and/or an animal or vegetable oil derivative, and/or a conjugated polyene compound, and may further include other components such as liquid components and various additives.

Hereinafter, the ink composition for plasma curing and the additive for an ink composition for plasma curing according to the present invention will be described in detail.

[Photocatalyst Compound]

The photocatalyst compound may be any semiconductor or the like that, when irradiated with light such as ultraviolet light or visible light, absorbs light energy greater than or equal to its band-gap energy to enter an excited state and exhibit photocatalysis.

The photocatalyst compound may be, for example, a compound that is a semiconductor such as an oxide, a nitride, a sulfide, an oxynitride, an oxysulfide, a nitrofluoride, an oxyfluoride, or an oxynitrofluoride of a metal and that exhibits photocatalytic activity. Examples include, but are not limited to, (anatase-type) titanium oxide, titanium peroxide, tungsten oxide, niobium oxide, bismuth oxide, zinc oxide, tin oxide, iron oxide, copper oxide, vanadium oxide, gallium oxide, lithium titanate, and strontium titanate.

These may be doped (lattice-substituted) with one or more dopants, for example, metal elements such as gold, silver, copper, platinum, rhodium, palladium, ruthenium, iridium, chromium, niobium, manganese, cobalt, vanadium, iron, and nickel and halogens such as boron, carbon, nitrogen, sulfur, phosphorus, and fluorine. The photocatalyst compound may be used alone or in combination of two or more.

The average particle size of the photocatalyst compound is not particularly limited, but in view of, for example, dispersion stability and fluidity, it is typically 0.001 to 100 µm, preferably 0.01 to 50 µm, more preferably 0.05 to 5 µm. A photocatalyst compound having an average particle size of less than 0.001 is difficult to produce and may be problematic in terms of, for example, fluidity and dispersion stability. A photocatalyst compound having an average particle size of more than 100 µm may be problematic in terms of, for example, dispersion stability.

The content of the photocatalyst compound based on the total mass of the ink composition for plasma curing is typically 0.001 to 10 mass %, preferably 0.05 to 5 mass %, more preferably 0.1 to 3 mass %. The content of the photocatalyst compound based on the total mass of the additive for an ink composition for plasma curing is typically 0.001 to 100 mass %, preferably 0.05 to 100 mass %, more preferably 0.1 to 100 mass %.

[Composite of Metal Component and Photocatalyst Compound]

The composite of a metal component and a photocatalyst compound is a composite body formed of the metal component and the photocatalyst compound.

Examples include:

(1) A composite body formed, for example, by deposition, coating, adsorption, or reaction of a metal component, for example, on a surface of a photocatalyst compound, (2) A composite body formed, for example, by deposition, coating, adsorption, or reaction of a photocatalyst compound, for example, on a surface of a metal component, (3) A composite body formed by mixing a metal component with a photocatalyst compound optionally under conditions such as heat treatment and/or pressure treatment, (4) A composite body formed by mixing a metal component with a photocatalyst compound and then optionally performing, for example, heat treatment and/or pressure treatment,
(5) A composite body formed by mixing a metal component and/or a precursor thereof with a photocatalyst compound and/or a precursor thereof and then converting the metal component precursor into the metal component and/or converting the photocatalyst compound precursor into the photocatalyst compound, and
(6) A composite body formed by adding a metal component and/or a precursor thereof and a photocatalyst compound and/or a precursor thereof to an ink composition or an additive for an ink composition and, for example, mixing them so that a composite of the metal component and the photocatalyst compound is formed in the ink composition or the additive for an ink composition.

The metal component may be any substance that includes a metal or a metal component. Preferred is one or more selected from elemental metals, metal oxides, metal nitrides, metal sulfides, metal oxynitrides, metal oxysulfides, metal nitrofluorides, metal oxyfluorides, metal oxynitrofluorides, inorganic acid metal salts, organic acid metal salts, and organometallic compounds. Particularly preferred examples include one or more elemental metals, metal oxides, inorganic acid metal salts, and organic acid metal salts. The metal component may be in any form such as particles, dispersions, solutions, melts, precursors, and gases.

Examples of metals include groups 1 to 15 metals and semimetals of the periodic table. Examples include one or more alkali metals (e.g., lithium, sodium, and potassium), alkaline-earth metals (e.g., magnesium, calcium, strontium, and barium), transition metals (scandium, titanium, vanadium, chromium, manganese, iron, cobalt, nickel, copper, yttrium, zirconium, niobium, molybdenum, ruthenium, rhodium, palladium, silver, hafnium, tantalum, tungsten, rhenium, iridium, platinum, and gold), zinc, cadmium, aluminum, gallium, indium, silicon, germanium, tin, lead, antimony, bismuth, tellurium, and astatine. Preferred examples include one or more of magnesium, titanium, vanadium, iron, nickel, copper, palladium, silver, platinum, gold, zinc, aluminum, and tin, and particularly preferred examples include one or more of iron, nickel, copper, silver, zinc, and aluminum.

Preferred examples of elemental metals include one or more of iron, nickel, copper, silver, zinc, and aluminum.

Preferred examples of metal oxides include one or more of titanium oxide, zinc oxide, tungsten oxide, copper oxide, cuprous oxide, iron oxide, calcium oxide, silicon oxide, and aluminum oxide.

Inorganic acid metal salts are salts of one or more of the above metals and one or more of hydrogen halides (hydrogen fluoride, hydrogen chloride, hydrogen bromide, and hydrogen iodide) and inorganic acids such as carbonic acid, sulfuric acid, nitric acid, phosphoric acid, silicic acid, titanic acid, vanadic acid, and molybdenum acid. Preferred examples include one or more of copper chloride, copper bromide, iron chloride, calcium carbonate, calcium phosphate (various apatites), copper nitrate, iron nitrate, and iron sulfate.

Organic acid metal salts are salts of one or more of the above metals and one or more of organic acids such as carboxylic acid, sulfonic acid, and phosphonic acid. Preferred examples include one or more carboxylic acid metal salts, and particularly preferred examples include one or more metallic soaps.

Any metallic soap commonly used for an ink composition used for printing may be used, and salts of metals and one or more fatty acids having 8 or more carbon atoms are used.

Examples of fatty acids having 8 or more carbon atoms include nonanoic acid, decanoic acid, octylic acid (2-ethylhexanoic acid), naphthenic acid, neodecanoic acid, lauric acid, palmitic acid, stearic acid, oleic acid, linoleic acid, isooctanoic acid, tall oil fatty acid, linseed oil fatty acid, soybean oil fatty acid, tung oil fatty acid, dimethylhexanoic acid, 3,5,5-trimethylhexanoic acid, dimethyloctanoic acid, and resin acids.

Examples of metals constituting a metallic soap include transition metals such as cobalt, manganese, copper, iron, and zirconium; alkaline-earth metals such as magnesium, calcium, and barium; rare earth metals such as cerium; and metals such as zinc, lead, and lithium.

Preferably, one or more of salts of one or more fatty acids selected from naphthenic acid, neodecanoic acid, lauric acid, palmitic acid, stearic acid, oleic acid, isooctanoic acid, tall oil fatty acid, linseed oil fatty acid, soybean oil fatty acid, and tung oil fatty acid and one or more metals selected from cobalt, manganese, zirconium, copper, iron, zinc, calcium, barium, and lead are used.

More preferably, one or more salts of one or more fatty acids selected from naphthenic acid, neodecanoic acid, lauric acid, stearic acid, tall oil fatty acid, linseed oil fatty acid, soybean oil fatty acid, and tung oil fatty acid and one or more metals selected from cobalt, manganese, zirconium, copper, iron, and zinc are used.

These metallic soaps may be used alone or in combination of two or more.

As the photocatalyst compound constituting the composite of a metal component and a photocatalyst compound, one or more of the photocatalyst compounds described in [Photocatalyst Compound] Above can be Used without Limitation.

The average particle size of the composite of a metal component and a photocatalyst compound is not particularly limited, but in view of, for example, dispersion stability and fluidity, it is typically 0.001 to 100 μm, preferably 0.01 to 50 μm, more preferably 0.05 to 5 μm. A composite having an average particle size of less than 0.001 is difficult to produce and may be problematic in terms of, for example, fluidity and dispersion stability. A composite having an average particle size of more than 100 μm may be problematic in terms of, for example, dispersion stability.

In the composite of a metal component and a photocatalyst compound, the content of the metal component based on the total mass of the composite is typically 0.1 to 99.9 mass %, preferably 1 to 99 mass %, more preferably 5 to 95 mass %, most preferably 10 to 90 mass %.

If the content of the metal component is less than 0.1 mass %, the action and effect of the metal component are not produced. If the content of the metal component is more than 99.9 mass %, light will not reach the photocatalyst compound so that, for example, the photocatalytic activity is inhibited, and as a result, the action and effect of the photocatalyst compound are not produced. Thus, in either case, when a printed film of the ink composition for plasma curing is irradiated with a plasma, it may be difficult to make the dry-curing start time earlier or improve the dry-curability of the film.

The content of the composite of a metal component and a photocatalyst compound based on the total mass of the ink composition for plasma curing is typically 0.001 to 10 mass %, preferably 0.05 to 5 mass %, more preferably 0.1 to 3 mass %. The content of the composite of a metal component and a photocatalyst compound based on the total mass of the additive for an ink composition for plasma curing is typically 0.001 to 100 mass %, preferably 0.05 to 100 mass %, more preferably 0.1 to 100 mass %.

The metal content (net metal content) attributed to the metal component included in the composite of a metal component and a photocatalyst compound is controlled so as to be typically 0.0005 to 0.2 mass %, preferably 0.001 to 0.1 mass %, more preferably 0.001 to 0.05 mass %, based on the total mass of the ink composition for plasma curing. If the metal content attributed to the metal component included in the composite of a metal component and a photocatalyst compound is beyond the above range, when a printed film of ink composition for plasma curing is irradiated with a plasma, it may be difficult to make the dry-curing start time earlier or improve the dry-curability of the film.

The composite of a metal component and a photocatalyst compound can be produced by a known method.

Examples include:
(1) A method of forming a composite body, for example, by deposition, coating, adsorption, or reaction of a metal component, for example, on a surface of a photocatalyst compound,
(2) A method of forming a composite body, for example, by deposition, coating, adsorption, or reaction of a photocatalyst compound, for example, on a surface of a metal component,
(3) A method of forming a composite body by mixing a metal component with a photocatalyst compound optionally under conditions such as heat treatment and/or pressure treatment,
(4) A method of forming a composite body by mixing a metal component with a photocatalyst compound and then optionally performing, for example, heat treatment and/or pressure treatment, and
(5) A method of forming a composite body by mixing a metal component and/or a precursor thereof with a photocatalyst compound and/or a precursor thereof and then converting the metal component precursor into the metal component and/or converting the photocatalyst compound precursor into the photocatalyst compound, and
(6) A method of adding a metal component and/or a precursor thereof and a photocatalyst compound and/or a precursor thereof to an ink composition or an additive for an ink composition and, for example, mixing them so that a composite of the metal component and the photocatalyst compound is formed in the ink composition or the additive for an ink composition.

The above methods (1) and (2) are performed by mixing a metal component with a photocatalyst compound using a known or commonly used stirring and dispersing means.

In the above methods (3) and (4), the heat treatment may be a treatment, for example, at a temperature at which the metal component and/or the photocatalyst compound melts or vaporizes, and the pressure treatment may be a pressurization or decompression treatment.

The metal component precursor used in the above method (5) can be formed into a metal component by means of, for example, heat treatment, and the photocatalyst compound precursor can be formed into a photocatalyst compound by means of, for example, heat treatment. Example thereof include alkoxide compounds, hydroxides, carbonates, organometallic compounds, and complexes of metals such as titanium, silicon, aluminum, zinc, germanium, gallium, and iron.

The above method (6) involves adding a metal component and/or a precursor thereof and a photocatalyst compound and/or a precursor thereof to an ink composition or an additive and, for example, mixing them using, for example, a stirring and dispersing means so as to form a composite, to thereby form the composite in the ink composition or the additive.

In the above methods (1) to (6), the metal component and/or the precursor thereof and the photocatalyst compound and/or the precursor thereof can be mixed together using a known or commonly used stirring and dispersing means to form a composite.

In the mixing, for example, various stirring and dispersing devices including mixers such as paint shakers, butterfly mixers, planetary mixers, pony mixers, dissolvers, tank mixers, homo-mixers, and homo-dispers; mills such as attritors, roll mills, sand mills, ball mills, bead mills, line mills, ultrasonic mills, dyno-mills, and shot mills; kneaders; mixing kneaders; and high-pressure impinging dispersers may be used, and such stirring and dispersing devices need not be used. A single stirring and dispersing device may be used to perform a stirring and dispersing treatment once or multiple times, or two or more stirring and dispersing devices may be used in combination to perform the stirring and dispersing treatment multiple times.

If necessary, when the stirring and dispersing treatment is performed multiple times, a liquid component or various additive components may be further added, and the resultant may be stirred and dispersed using the above stirring and dispersing device.

The metal component and/or the precursor thereof in forming a composite body may be in any form and is preferably in a hot molten state, a solid state such as powder, a dispersion state in an appropriate solvent, a solution state in an appropriate solvent, or a gas state. The photocatalyst compound and/or the precursor thereof in forming a composite body may be in any form and is preferably in a hot molten state, a solid state such as powder, a dispersion state in an appropriate solvent, a solution state in an appropriate solvent, or a gas state.

The reason why the photocatalyst compound and/or the composite of a metal component and a photocatalyst compound improves the curability of the ink composition upon plasma irradiation is not necessarily clear. It is presumed that light emission of a plasma excites the photocatalyst compound to form highly active chemical species such as hydroxy radicals and superoxide anions, and such chemical species assist in dry-curing (e.g., polymerization) of the components included in the ink composition for plasma curing.

[Binder]

As the binder, any resin used as a binder or binding agent in the field of ink compositions or any curable compounds having an ethylenically unsaturated bond can be used without particular limitation. One of them or a mixture of two or more of them can be used.

The binder is, for example, at least one resin selected from the group consisting of acrylic resins, polyester resins, styrene resins, polyolefin resins, epoxy resins, polyurethane resins, phenolic resins, rosin resins, block polymers, graft polymers (core-shell polymers), acrylic-modified phenolic resins, rosin-modified phenolic resins, rosin-modified maleic acid resins, rosin-modified alkyd resins, rosin-modified petroleum resins, rosin ester resins, petroleum resin-modified phenolic resins, alkyd resins, vegetable oil-modified alkyd resins, petroleum resins, and hydrocarbon resins (e.g., polybutene and polybutadiene) and has a weight average molecular weight of 500 to 300000.

Preferably, at least one selected from the group consisting of acrylic resins, polyester resins, polyolefin resins, polyurethane resins, phenolic resins, rosin resins, acrylic-modified phenolic resins, rosin-modified phenolic resins, rosin-modified maleic acid resins, rosin-modified alkyd resins, rosin-modified petroleum resins, rosin ester resins, petroleum resin-modified phenolic resins, alkyd resins, and vegetable oil-modified alkyd resins is used. Particularly preferably, one or more selected from the group consisting of rosin-modified phenolic resins, rosin-modified maleic acid resins, rosin-modified alkyd resins, rosin ester resins, alkyd resins, and vegetable oil-modified alkyd resins are used. From the viewpoint of quick-drying properties upon plasma irradiation, the acid value of the resin is preferably 10 mgKOH/g or more.

Fatty acid-modified rosin resins can also be used as preferred binders. A fatty acid-modified rosin resin is obtained by mixing a fatty acid-modified material with a rosin resin to cause a reaction.

Examples of fatty acid-modified materials used in producing a fatty acid-modified rosin resin include natural or synthetic fatty acids having about 2 to 30 carbon atoms, such as decanoic acid, lauric acid, myristic acid, octanoic acid, palmitic acid, stearic acid, oleic acid, linoleic acid, linolenic acid, ricinoleic acid, eleostearic acid, acetic acid, fumaric acid, maleic acid, maleic anhydride, itaconic acid, citraconic acid, citraconic anhydride, acrylic acid, and methacrylic acid; animal or vegetable oils such as tung oil, soybean oil, linseed oil, castor oil, sunflower oil, safflower oil, corn oil, cottonseed oil, rice oil (rice bran oil), rapeseed oil, canola oil, perilla oil, sesame oil, camellia oil, olive oil, peanut oil, grape seed oil, coconut oil, tall oil, palm oil, palm kernel oil, beef tallow, horse oil, lard, chicken oil, fish oils such as sardine oil and saury oil, whale oil, shark oil, lanolin, mink oil, and beeswax; and derivatives of these animal or vegetable oils (modified products of animal or vegetable oils, such as oxidatively polymerized oils (boiled oils), thermally polymerized oils (stand oils), dehydrated products, and esterified products). One or more fatty acid-modified materials can be used.

Here, the esterified products of animal or vegetable oils are obtained, typically, by transesterification of alcohols and animal or vegetable oils that are triglycerides of fatty acids. Preferred are animal or vegetable oil-derived fatty acid esters composed of saturated or unsaturated fatty acids having 14 to 30 carbon atoms, such as stearic acid, isostearic acid, hydroxystearic acid, oleic acid, linoleic acid, linolenic acid, and eleostearic acid, and linear or branched monoalcohols having 1 to 10 carbon atoms.

Examples of modified products of animal or vegetable oils include one or more of oxidatively polymerized oils (boiled oils), thermally polymerized oils (stand oils), and dehydrated products of the above animal or vegetable oils, such as polymerized soybean oil, polymerized linseed oil, polymerized castor oil, polymerized tung oil, dehydrated castor oil, and polymerized dehydrated castor oil; and animal or vegetable oil-derived fatty acid esters such as soybean oil methyl ester, soybean oil ethyl ester, soybean oil butyl ester, soybean oil isohexyl ester, linseed oil methyl ester, linseed oil ethyl ester, linseed oil butyl ester, linseed oil isohexyl ester, tung oil methyl ester, tung oil ethyl ester, tung oil butyl ester, tung oil isohexyl ester, palm oil methyl ester, palm oil ethyl ester, palm oil butyl ester, and palm oil isohexyl ester.

Examples of preferred fatty acid-modified materials include coconut oil and those having an iodine value of 80 or more. Particularly preferred examples include one or more of coconut oil, tung oil, soybean oil, tall oil, linseed oil, castor oil, safflower oil, perilla oil, polymerized soybean oil, polymerized linseed oil, polymerized castor oil, polymerized tung oil, polymerized dehydrated castor oil, dehydrated castor oil, soybean oil butyl ester, linseed oil butyl ester, and tung oil butyl ester.

Examples of rosin resins that can be used in producing a fatty acid-modified rosin resin include unmodified rosins such as wood rosin, gum rosin, and tall oil rosin; polymerized rosins, disproportionated rosins, stabilized rosins, and hydrogenated rosins obtained by modifying these unmodified rosins, for example, by polymerization, disproportionation, stabilization, and hydrogenation; rosins chemically modified, for example, by introducing various functional groups; rosin ester resins; rosin alcohol resins; and rosin resin metal salts. The rosin resins can be used alone or as a mixture of two or more.

Preferred are one or more of unmodified rosins, polymerized rosin esters, rosin esters, disproportionated rosins, and rosin resin metal salts, and particularly preferred are one or more of unmodified rosins, polymerized rosin esters, and rosin resin metal salts.

The weight average molecular weight of the rosin resin is typically in the range of 1000 to 200000, preferably in the range of 10000 to 150000, particularly preferably in the range of 15000 to 100000.

The amount of fatty acid modification (the amount of fatty acid introduction) in the fatty acid-modified rosin resin is typically 5 to 50 mass %, preferably 10 to 40 mass %, particularly preferably 10 to 20 mass %. If the amount is less than 5 mass %, the effect of fatty acid modification may be insufficient to reduce coating curability, and if the amount is more than 50 mass %, the properties of the rosin resin may be degraded to reduce coating curability.

As the binder, an oligomer and/or a polymer having an ethylenically unsaturated bond may be used.

Examples of oligomers having an ethylenically unsaturated bond include epoxy-modified (meth)acrylates such as esters of (meth)acrylic acid and hydroxyl groups formed after epoxy groups included in epoxy compounds such as epoxy resins are ring-opened with acids or bases; rosin-modified epoxy acrylates; polyester-modified (meth)acrylates such as esters of (meth)acrylic acid and terminal hydroxyl groups of polycondensates of dibasic acids and diols; polyether-modified (meth)acrylates such as esters of (meth)acrylic acid and terminal hydroxyl groups of polyether compounds; and urethane-modified (meth)acrylates such as esters of (meth)acrylic acid and terminal hydroxyl groups of condensates of polyisocyanate compounds and polyol compounds. Such oligomers are commercially available under the trade names of, for example, EBERCRYL series manufactured by Daicel-Cytec Co., Ltd.; CN and SR series manufactured by Sartomer; ARONIX M-6000 series, M-7000 series, M-8000 series, ARONIX M-1100, ARONIX M-1200, and ARONIX M-1600 manufactured by Toagosei Co., Ltd.; and NK OLIGO manufactured by Shin-Nakamura Chemical Co., Ltd. These oligomers can be used alone or in combination of two or more.

Examples of polymers or oligomers having an ethylenically unsaturated bond include polydiallyl phthalate, acrylic resins having an unreacted unsaturated group, and acrylic-modified phenolic resins. Preferred is polydiallyl phthalate.

The curable compound having an ethylenically unsaturated bond is a monomer having the ability to polymerize upon plasma irradiation to cure the ink composition. Examples include monofunctional monomers having one ethylenically unsaturated bond in their molecules and bi- or higher functional monomers having two or more ethylenically unsaturated bonds in their molecules.

Bi- or higher functional monomers can cross-link a molecule to a molecule during the curing of the ink composition and thus are useful for increasing the cure rate or forming a strong film. Monofunctional monomers do not have the cross-linkability described above but are useful for reducing the cure shrinkage associated with cross-linking. One or more monofunctional monomers and/or one or more bi- or higher functional monomers can be used in any combination as required.

Any monofunctional monomer known in the art can be used without limitation. Examples include, but are not limited to, (cyclo)alkyl (meth)acrylates such as methyl (meth)acrylate, ethyl (meth)acrylate, butyl (meth)acrylate, hexyl (meth)acrylate, octyl (meth)acrylate, dodecyl (meth)acrylate, t-butyl acrylate, amyl (meth)acrylate, isoamyl (meth)acrylate, isooctyl (meth)acrylate, isostearyl (meth)acrylate, isodecyl (meth)acrylate, isobutyl acrylate, isomyristyl (meth)acrylate, octadecyl (meth)acrylate, dicyclopentanyl (meth)acrylate, dicyclopentenyl (meth)acrylate, stearyl (meth)acrylate, decyl (meth)acrylate, tridecyl (meth)acrylate, nonyl (meth)acrylate, norbornyl (meth)acrylate, propyl (meth)acrylate, hexadecyl (meth)acrylate, myristyl (meth)acrylate, lauryl (meth)acrylate, isobornyl (meth)acrylate, cyclohexyl (meth)acrylate, 1-adamantyl (meth)acrylate, 2-ethylhexyl (meth)acrylate, 3,5,5-trimethylcyclohexyl acrylate, and 4-t-butylcyclohexyl (meth)acrylate; unsaturated carboxylic acids such as (meth)acrylic acid, itaconic acid, crotonic acid, fumaric acid, maleimide, and maleic acid, and salts thereof; (meth)acrylic acid ethylene oxide adducts, (meth)acrylic acid propylene oxide adducts, and (poly)alkylene glycol-modified (meth)acrylates such as diethylene glycol mono(meth)acrylate, triethylene glycol mono(meth)acrylate, polyethylene glycol mono(meth)acrylate, dipropylene glycol mono(meth)acrylate, polypropylene glycol mono(meth)acrylate, 2-ethylhexyl EO-modified (meth)acrylate, o-phenylphenol EO-modified acrylate, p-cumylphenol EO-modified (meth)acrylate, and nonylphenol EO-modified (meth)acrylate;

alkoxy and/or phenoxy (meth)acrylates such as phenoxydiethylene glycol (meth)acrylate, phenoxy-polyethylene glycol (meth)acrylate, hexaethylene glycol monophenyl ether mono(meth)acrylate, ethoxydiethylene glycol (meth)acrylate, diethylene glycol monobutyl ether acrylate, dipropylene glycol monomethyl ether (meth)acrylate, methoxydiethylene glycol (meth)acrylate, methoxydipropylene glycol (meth)acrylate, methoxytriethylene glycol (meth)acrylate, methoxypropylene glycol (meth)acrylate, methoxypolyethylene glycol (meth)acrylate, 2-(2-ethoxyethoxy)ethyl (meth)acrylate, 2-ethoxyethyl (meth)acrylate, 2-methoxyethyl (meth)acrylate, 3-methoxybutyl acrylate, ethoxyethyl acrylate, ethoxyethoxyethyl (meth)acrylate, butoxyethyl (meth)acrylate, methoxyethyl (meth)acrylate, alkoxylated 2-phenoxyethyl (meth)acrylate, alkoxylated nonylphenyl (meth)acrylate, 2-phenoxyethyl (meth)acrylate, ethoxy 2-phenoxyethyl (meth)acrylate, ethoxylated (4)nonylphenol acrylate, nonylphenoxyethyl (meth)acrylate, para-cumylphenoxy ethylene glycol (meth)acrylate, phenoxyethyl (meth)acrylate, propoxylated 2-phenoxyethyl (meth)acrylate, methylphenoxyethyl acrylate, ethoxylated succinic acid acrylate, ethoxylated tribromophenyl acrylate, and ethoxylated nonylphenyl (meth)acrylate; heterocyclic (meth)acrylates such as (2-methyl-2-ethyl-1,3-dioxolan-4-yl)methyl (meth)acrylate, 1-(meth)acryloylpiperidin-2-one, 2-(meth)acrylic acid-1,4-dioxaspiro[4,5]dec-2-ylmethyl, N-(meth)acryloyloxyethyl hexahydrophthalimide, N-(meth)acryloylmorpholine, glycidyl (meth)acrylate, tetrahydrofurfuryl (meth)acrylate, γ-butyrolactone (meth)acrylate, caprolactone-modified tetrahydrofurfuryl acrylate, and imide acrylate;

(meth)acrylamides such as (meth)acrylamide, N,N-diethyl (meth)acrylamide, N,N-dimethyl (meth)acrylamide, N,N-dimethylaminopropyl (meth)acrylamide, diacetone acrylamide, diethyl acrylamide, dimethyl (meth)acrylamide, and dimethylaminopropyl (meth)acrylamide; and various monofunctional monomers such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, hydroxypentyl (meth)acrylate, 2-hydroxy-3-phenoxypropyl (meth)acrylate, 2-hydroxy-3-butoxypropyl (meth)acrylate, 2-hydroxy-3-methoxypropyl (meth)acrylate, glycerol mono(meth)acrylate, acryloxyethyl phthalate, 2-(meth)acryloyloxyethyl-2-hydroxyethyl phthalate, 2-(meth)acryloyloxypropyl phthalate, tricyclodecane monomethylol (meth)acrylate, β-carboxyethyl (meth)acrylate, (meth)acrylic acid dimers, ω-carboxypolycaprolactone mono(meth)acrylate, dimethylaminoethyl (meth)acrylate, diethylaminoethyl (meth)acrylate, 2-(meth)acryloyloxyethyl succinic acid, 2-(meth)acryloyloxyethyl hexahydrophthalic acid, 2-ethylhexyl-diglycol (meth)acrylate, N,N-dimethylaminoethyl (meth)acrylate, N,N-dimethylaminopropyl (meth)acrylate, aminoethyl (meth)acrylate, ethylcarbitol acrylate, ethyldiglycol acrylate, dimethylaminoethyl acrylate benzyl chloride quaternary salts, trifluoroethyl (meth)acrylate, trifluoromethyl (meth)acrylate, tribromophenyl (meth)acrylate, 1,4-cyclohexanedimethanol mono(meth)acrylate, (meth)acrylonitrile, cresol acrylate, dicyclopentenyloxyethyl (meth)acrylate, trimethylolpropane formal (meth)acrylate, neopentyl glycol (meth)acrylic acid benzoic acid ester, benzyl (meth)acrylate, vinyl acetate, styrene, vinyltoluene, N-vinyl-2-caprolactam, N-vinylpyrrolidone, N-vinylformamide, N-vinylacetamide, and N-vinylcarbazole.

Any bifunctional monomer known in the art can be used without limitation. Examples include, but are not limited to, 1,10-decanediol di(meth)acrylate, 1,12-dodecanediol di(meth)acrylate, 1,14-tetradecanediol di(meth)acrylate, 1,16-hexadecanediol di(meth)acrylate, 1,2-octanediol di(meth)acrylate, 1,2-decanediol di(meth)acrylate, 1,2-tetradecanediol di(meth)acrylate, 1,2-dodecanediol di(meth)acrylate, 1,2-hexadecanediol di(meth)acrylate, 1,2-hexanediol di(meth)acrylate, 1,3-butylene glycol di(meth)acrylate, 1,4-dimethyl-2,4-pentanediol di(meth)acrylate, 1,4-butanediol di(meth)acrylate, 1,5-dimethyl-2,5-hexanediol di(meth)acrylate, 1,5-hexanediol di(meth)acrylate, 1,5-pentanediol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 2,2,4-trimethyl-1,3-pentanediol di(meth)acrylate, 2,2-diethyl-1,3-propanediol di(meth)acrylate, 2,4-diethyl-1,5-pentanediol di(meth)acrylate, 2,5-dimethyl-2,5-hexanediol di(meth)acrylate, 2,5-hexanediol di(meth)acrylate, 2-methyl-1,3-butylene glycol di(meth)acrylate, 2-n-butyl-2-ethyl-1,3-propanediol di(meth)acrylate, 2-ethyl-1,3-hexanediol di(meth)

acrylate, 2-butyl-2-ethyl-1,3-propanediol di(meth)acrylate, 2-methyl-1,8-octanediol di(meth)acrylate, 2-methyl-2,4-pentanediol di(meth)acrylate, 2-methyl-2-propyl-1,3-propanediol di(meth)acrylate, 3-methyl-1,5-pentanediol di(meth)acrylate, ethylene glycol di(meth)acrylate, glycerol di(meth)acrylate, diethylene glycol di(meth)acrylate, cyclohexanedimethanol di(meth)acrylate, dicyclopentanyl di(meth)acrylate, dipropylene glycol di(meth)acrylate, dimethyloloctane di(meth)acrylate, dimethylol-tricyclodecane di(meth)acrylate, dimethylolpropane di(meth)acrylate, tetraethylene glycol di(meth)acrylate, triethylene glycol di(meth)acrylate, tricyclodecanedimethylol di(meth)acrylate, tris(2-hydroxyethyl) isocyanurate di(meth)acrylate, tripropylene glycol di(meth)acrylate, neopentyl glycol di(meth)acrylate, bisphenol A di(meth)acrylate, bisphenol F di(meth)acrylate, hydroxypivalyl hydroxypivalate di(meth)acrylate, hydroxypivalic acid neopentyl glycol di(meth)acrylate, butylene glycol di(meth)acrylate, propylene glycol di(meth)acrylate, hexanediol diacrylate, pentyl glycol di(meth)acrylate, polyethylene glycol di(meth)acrylate, polytetramethylene glycol di(meth)acrylate, polypropylene glycol di(meth)acrylate, hydrogenated bisphenol A di(meth)acrylate, hydrogenated bisphenol F di(meth)acrylate, diethylene glycol divinyl ether, cyclohexane dimethanol divinyl ether, dipropylene glycol divinyl ether, triethylene glycol divinyl ether, trimethylolpropane divinyl ether, butanediol divinyl ether, propylene glycol divinyl ether, hexanediol divinyl ether, trimethylolpropane diallyl ether, vinyloxyalkyl (meth)acrylate, (meth)acrylic acid polyethylene glycol monovinyl ether, (meth)acrylic acid polypropylene glycol monovinyl ether, vinyloxyethoxyethyl (meth)acrylate, and N,N'-methylenebisacrylamide.

Further examples include, but are not limited to, alkoxylated (e.g., ethoxylated, propoxylated, and butoxylated) products, alkylene oxide-modified (e.g., ethylene oxide-modified and propylene oxide-modified) products, and caprolactone-modified products of the above bifunctional monomers, such as bisphenol A tetraethylene oxide adduct di(meth)acrylate, bisphenol A tetraethylene oxide adduct dicaprolactonate di(meth)acrylate, bisphenol F tetraethylene oxide adduct di(meth)acrylate, bisphenol F tetraethylene oxide adduct dicaprolactonate di(meth)acrylate, bisphenol S tetraethylene oxide adduct di(meth)acrylate, hydroxypivalyl hydroxypivalate dicaprolactonate di(meth)acrylate, hydrogenated bisphenol A tetraethylene oxide adduct di(meth)acrylate, and hydrogenated bisphenol F tetraethylene oxide adduct di(meth)acrylate.

Any trifunctional monomer known in the art can be used without limitation. Examples include, but are not limited to, glycerol tri(meth)acrylate, tetramethylolmethane triacrylate, tris(2-hydroxyethyl) isocyanurate tri(meth)acrylate, trimethylolethane tri(meth)acrylate, trimethylolethane tri(meth)acrylate, trimethyloloctane tri(meth)acrylate, trimethylolpropane tri(meth)acrylate, trimethylolpropane trivinyl ether, trimethylolhexane tri(meth)acrylate, pentaerythritol tri(meth)acrylate, pentaerythritol triallyl ether, and pentaerythritol trivinyl ether.

Any tetrafunctional or higher functional monomer known in the art can be used without limitation. Examples include, but are not limited to, diglycerol tetra(meth)acrylate, ditrimethylolethane tetra(meth)acrylate, ditrimethyloloctane tetra(meth)acrylate, ditrimethylolbutane tetra(meth)acrylate, ditrimethylolpropane tetra(meth)acrylate, ditrimethylolpropane tetracaprolactonate tetra(meth)acrylate, ditrimethylolhexane tetra(meth)acrylate, trimethylolpropane tetra(meth)acrylate, pentaerythritol tetra(meth)acrylate, pentaerythritol tetraallyl ether, pentaerythritol tetracaprolactonate tetra(meth)acrylate, pentaerythritol tetravinyl ether, dipentaerythritol penta(meth)acrylate, dipentaerythritol hexa(meth)acrylate, tripentaerythritol hexa(meth)acrylate, tripentaerythritol hepta(meth)acrylate, tripentaerythritol polyalkylene oxide hepta(meth)acrylate, and tripentaerythritol octa(meth)acrylate.

Further examples include, but are not limited to, alkoxylated (e.g., ethoxylated, propoxylated, and butoxylated) products, alkylene oxide-modified (e.g., ethylene oxide-modified and propylene oxide-modified) products, and caprolactone-modified products of the above trifunctional monomers and tetrafunctional or higher functional monomers, such as glycerol propoxy tri(meth)acrylate and trimethylolpropane tricaprolactonate tri(meth)acrylate.

Of these monomers, alkyl acrylates such as methyl (meth)acrylate, ethyl (meth)acrylate, butyl (meth)acrylate, hexyl (meth)acrylate, octyl (meth)acrylate, and dodecyl (meth)acrylate, (meth)acrylic acid, (meth)acrylic acid ethylene oxide adducts, (meth)acrylic acid propylene oxide adducts, isobornyl (meth)acrylate, cyclohexyl (meth)acrylate, hexanediol diacrylate (HDDA), trimethylolpropane triacrylate (TMPTA), glycerol propoxy triacrylate (GPTA), ditrimethylolpropane tetraacrylate (DITMPTA), dipentaerythritol hexaacrylate (DPHA), etc. are preferred.

The binder is contained in an amount of typically 0 to 70 mass %, preferably 0 to 50 mass %, particularly preferably 15 to 30 mass %, in the ink composition for plasma curing according to the present invention. The binder is contained in an amount of 0 to 99 mass % based on the total mass of the additive for an ink composition for plasma curing.

[Animal or Vegetable Oil and/or Animal or Vegetable Oil Derivative]

Examples of animal or vegetable oils include tung oil, soybean oil, linseed oil, castor oil, sunflower oil, safflower oil, corn oil, cottonseed oil, rice oil (rice bran oil), rapeseed oil, canola oil, perilla oil, sesame oil, camellia oil, olive oil, peanut oil, grape seed oil, coconut oil, tall oil, palm oil, palm kernel oil, beef tallow, horse oil, lard, chicken oil, fish oils such as sardine oil and saury oil, whale oil, shark oil, lanolin, mink oil, beeswax, and mixtures of two or more thereof.

Of these, those having an iodine value of 80 or more are preferred. Particularly preferably, one or more of tung oil, soybean oil, linseed oil, castor oil, safflower oil, and perilla oil are used, and most preferably, one or more of tung oil, soybean oil, castor oil, and linseed oil are used.

Examples of animal or vegetable oil derivatives include modified products of the above animal or vegetable oils.

Here, as the modified products of animal or vegetable oils, one or more of oxidatively polymerized oils (boiled oils), thermally polymerized oils (stand oils), dehydrated products, esterified products, etc. of the above animal or vegetable oils can be used.

The esterified products of the above animal or vegetable oils are obtained, typically, by transesterification of alcohols and animal or vegetable oils that are triglycerides of fatty acids, and are preferably animal or vegetable oil-derived fatty acid esters composed of saturated or unsaturated fatty acids having 14 to 30 carbon atoms, such as stearic acid, isostearic acid, hydroxystearic acid, oleic acid, linoleic acid, linolenic acid, and eleostearic acid, and linear or branched monoalcohols having 1 to 10 carbon atoms.

Examples of modified products of animal or vegetable oils include one or more of oxidatively polymerized oils (boiled oils), thermally polymerized oils (stand oils), and dehydrated products of the above animal or vegetable oils, such as polymerized soybean oil, polymerized linseed oil, polymerized castor oil, polymerized tung oil, dehydrated castor oil, and polymerized dehydrated castor oil; and animal or vegetable oil-derived fatty acid esters such as soybean oil methyl ester, soybean oil ethyl ester, soybean oil butyl ester, soybean oil isohexyl ester, linseed oil methyl ester, linseed oil ethyl ester, linseed oil butyl ester, linseed oil isohexyl ester, tung oil methyl ester, tung oil ethyl ester, tung oil butyl ester, tung oil isohexyl ester, palm oil methyl ester, palm oil ethyl ester, palm oil butyl ester, and palm oil isohexyl ester.

Of these, those having an iodine value of 80 or more are preferred. Particularly preferably, one or more of polymerized soybean oil, polymerized linseed oil, polymerized castor oil, polymerized tung oil, polymerized dehydrated castor oil, dehydrated castor oil, soybean oil butyl ester, linseed oil butyl ester, and tung oil butyl ester are used.

As the animal or vegetable oil and/or the animal or vegetable oil derivative, one of the above animal or vegetable oils and/or the above animal or vegetable oil derivatives or a mixture of two or more of them is used.

The animal or vegetable oil and/or the animal or vegetable oil derivative is contained in an amount of typically 0 to 70 mass %, preferably 20 to 70 mass %, particularly preferably 40 to 60 mass %, in the ink composition for plasma curing according to the present invention. The animal or vegetable oil and/or the animal or vegetable oil derivative is contained in an amount of 0 to 99 mass % based on the total mass of the additive for an ink composition for plasma curing.

[Conjugated Polyene Compound]

The conjugated polyene compound is a compound having what is called a conjugated double bond, which is a structure in which carbon-carbon double bonds and carbon-carbon single bonds are alternated with each other, the number of carbon-carbon double bonds being two or more.

The conjugated polyene compound may be a conjugated diene having a structure in which two carbon-carbon double bonds and one carbon-carbon single bond are alternated with each other, a conjugated triene having a structure in which three carbon-carbon double bonds and two carbon-carbon single bonds are alternated with each other, or a conjugated polyene compound having a structure in which more than three carbon-carbon double bonds and more than two carbon-carbon single bonds are alternated with each other.

A plurality of conjugated double bonds each including two or more carbon-carbon double bonds may be present in one molecule without being conjugated with each other. For example, a compound having three conjugated trienes in one molecule, such as tung oil, is also included in the conjugated polyene compound of the present invention.

Furthermore, the conjugated polyene compound may also have, in addition to the above conjugated double bond including two or more carbon-carbon double bonds, other functional groups, for example, various functional groups such as a carboxyl group and a salt thereof, a hydroxyl group, an ester group, a carbonyl group, an ether group, an amino group, an imino group, an amide group, a cyano group, a diazo group, a nitro group, a sulfone group, a sulfoxide group, a sulfide group, a thiol group, a sulfonic group and a salt thereof, a phosphate group and a salt thereof, a phenyl group, a halogen atom, a double bond, and a triple bond. Such a functional group may be directly bonded to a carbon atom in the conjugated double bond or may be bonded to a position away from the conjugated double bond. Therefore, the multiple bond in the functional group may be located at a position where it can be conjugated with the conjugated double bond. For example, 1-phenylbutadiene, which has a phenyl group, and sorbic acid, which has a carboxyl group, are also included in the conjugated polyene compound of the present invention.

Among the conjugated polyene compounds, examples of conjugated dienes having a conjugated structure with two carbon-carbon double bonds include isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnesene, cembrene, sorbic acid, sorbic acid esters, sorbic acid salts, abietic acid, and conjugated linoleic acid.

Among the conjugated polyene compounds, examples of conjugated triene compounds having a conjugated structure with three carbon-carbon double bonds include 1,3,5-hexatriene, 2,4,6-octatriene-1-carboxylic acid, eleostearic acid, tung oil, and cholecalciferol.

Among the conjugated polyene compounds, examples of conjugated polyene compounds having a conjugated structure with four or more carbon-carbon double bonds include cyclooctatetraene, 2,4,6,8-decatetraene-1-carboxylic acid, retinol, retinoic acid, parinaric acid, *Impatiens balsamina* seed oil, and carotenes.

Among these conjugated polyene compounds, animal or vegetable oils, eleostearic acid, etc. are preferred, and dehydrated castor oil, tung oil, and eleostearic acid are particularly preferred.

As the conjugated polyene compound, one of the above conjugated diene compounds and/or conjugated triene compounds and/or conjugated polyene compounds or a mixture of two or more of them is used.

The conjugated polyene compound is contained in an amount of typically 0 to 70 mass %, preferably 0 to 50 mass %, more preferably 5 to 30 mass %, in the ink composition for plasma curing according to the present invention. The conjugated polyene compound is contained in an amount of 0 to 99 mass % based on the total mass of the additive for an ink composition for plasma curing.

[Other Components]

The ink composition for plasma curing and/or the additive for an ink composition for plasma curing according to the present invention can further include various components depending on, for example, the desired biomass content, environmental performance, safety performance, and color tone.

Examples of such components include additives commonly used in the field of ink compositions, such as liquid components, colorants (e.g., coloring pigments, luster pigments, dyes, fluorescent pigments, and coloring resin particles), extender pigments, dispersants, surfactants, stabilizers, antifoaming agents, polymerization initiators, antifriction agents (waxes), gelling agents, viscosity modifiers, plasticizers, polymerization inhibitors, antioxidants, pH adjustors, antimicrobial and antifungal agents, and silane coupling agents. Examples also include dry-curing accelerators that are not "the photocatalyst compound and/or the composite of a metal component and a photocatalyst compound" described above.

When the ink composition for plasma curing and/or the additive for an ink composition for plasma curing according to the present invention includes other components, the content thereof is typically within the range where the dry-curability of the ink composition for plasma curing is not affected. However, when the ink composition for plasma curing includes components that affect the dry-curability, such as the above dry-curing accelerator, conjugated polyene compound, polymerization initiator, polymerization inhibitor, and rosin-treated particles, the content thereof may be within the range where the dry-curability of the ink composition for plasma curing is not affected or is affected.

(Liquid Component)

The liquid component is a liquid component that has hitherto been used in the preparation of ink compositions, and is used to dissolve resin to form a varnish or adjust the viscosity of the ink composition. The liquid component means a liquid component other than the above binders, animal or vegetable oils, animal or vegetable oil derivatives, and conjugated polyene compounds that are liquid. Examples of such liquid components include liquid compounds that are in a liquid state at a temperature during printing (typically, 10° C. to 40° C.), such as organic solvents, mineral oils, and water.

Examples of organic solvents for use include organic solvents including ketone solvents such as acetone, methyl ethyl ketone, diethyl ketone, and cyclohexanone; alcohol solvents such as methanol, ethanol, 2-propanol, 1-propanol, 1-butanol, and tert-butanol; chlorine solvents such as chloroform and methylene chloride; aromatic hydrocarbon solvents such as benzene, toluene, and xylene; aliphatic hydrocarbon solvents such as n-hexane, n-pentane, and cyclohexane; petroleum hydrocarbon solvents such as mineral spirits; ester solvents such as ethyl acetate, butyl acetate, and isopropyl acetate; ether solvents such as diethyl ether, tetrahydrofuran, and dioxane; glycol ether solvents such as ethylene glycol monomethyl ether, ethylene glycol dimethyl ether, and tripropylene glycol monomethyl ether; cyclic ester solvents such as γ-butyrolactone; amide solvents such as 2-methylpyrrolidone, 2-pyrrolidone, and dimethylacetamide. One or more of these organic solvents can be used.

Examples of mineral oils include light mineral oils and heavy mineral oils. To meet the OSHA standards in the United States or the EU standards, those containing a reduced amount of condensed polycyclic aromatic component are preferred. Examples of light mineral oils include non-aromatic petroleum solvents having boiling points of 160° C. or higher, preferably boiling points of 200° C. or higher, and examples of heavy mineral oils include various lubricating oils that have been classified as spindle oil, machine oil, dynamo oil, cylinder oil, etc. Specific examples include No. 0 Solvent, AF Solvent No. 5, AF Solvent No. 6, AF Solvent No. 7, Ink Oil H8, and Ink Oil H35 manufactured by JX Nippon Oil & Energy Corporation and SNH 8, SNH 46, SNH 220, and SNH 540 manufactured by SAN-KYO YUKA KOGYO K.K.

The liquid component is contained preferably, but not necessarily, in an amount of about 0 to 33 mass % based on the total mass of the ink composition for plasma curing according to the present invention and in an amount of about 0 to 99 mass % based on the total mass of the additive for an ink composition for plasma curing according to the present invention.

(Colorant)

Any colorant can be used as long as it is a component that has hitherto been used in the preparation of ink compositions and provides coloring power. Examples include inorganic coloring pigments, organic coloring pigments, luster pigments, dyes, fluorescent pigments, and coloring resin particles. The colorant may be in the form of particles or a dispersion, and to achieve a desired color tone, two or more colorants may be used as a mixture.

Of these, pigments and particles such as coloring resin particles may be surface treated with surface-treating agents such as rosin compounds, silane coupling agents, resins, and pigment derivatives or may be untreated.

Examples of coloring pigments include inorganic and/or organic coloring pigments of various colors such as red, blue, yellow, green, purple, black, white, orange, and brown that have conventionally been used for ink compositions. To achieve a desired color tone, two or more inorganic and/or organic coloring pigments may be used as a mixture.

Examples of inorganic coloring pigments include carbon black, iron black, titanium oxide, zinc oxide, white lead, chrome yellow, zinc yellow, cadmium yellow, iron red, cadmium red, ultramarine, iron blue, chromium oxide green, cobalt green, and (nickel-titanium, chromium-titanium, bismuth-vanadium, cobalt-aluminum, cobalt-aluminum-chromium, and ultramarine blue) composite oxides.

Examples of organic coloring pigments include phthalocyanine pigments, indanthrene pigments, azo pigments, quinacridone pigments, anthraquinone pigments, dioxane pigments, indigo pigments, thioindigo pigments, perinone pigments, perylene pigments, indoline pigments, azomethine pigments, isoindolinone pigments, isoindoline pigments, dioxazine pigments, quinophthalone pigments, metal complex pigments, diketopyrrolopyrrole pigments, polycyclic pigments, benzimidazolone pigments, anthrapyrimidine pigments, nitro pigments, nitroso pigments, and aniline black.

Examples of luster pigments include pigments having pearly lusters and interference lusters, such as powder and foil of metals such as aluminum, oxide-coated micas such as titanium dioxide-coated mica, oxide-coated glass flakes, argentine, and bismuth oxychloride.

Examples of dyes include water-soluble dyes, oil-soluble dyes, and disperse dyes of various colors such as red, blue, yellow, green, purple, black, white, orange, and brown that have conventionally been used for ink compositions. These may be acidic dyes, direct dyes, basic dyes, reactive dyes, or food colors.

Examples of fluorescent pigments include pigments that use light with a particular wavelength, such as ultraviolet light or infrared light, as excitation energy and emit light in a wavelength region different from the region of the particular wavelength.

Examples of coloring resin particles include fine particles of mixtures of resins with the above coloring pigments, luster pigments, dyes, and fluorescent pigments. Examples of the resins constituting the coloring resin particles include polyolefins, polystyrenes, acrylic resins, and urethane resins.

The above pigments may each be a self-dispersed pigment in which at least one hydrophilic or lipophilic group is bonded to the surface of the pigment directly or via any atomic group. The self-dispersed pigment is preferably ionic, and is particularly preferably anionically charged.

The colorant used is preferably not a dye from the viewpoint of weather resistance or plasma resistance.

It is also preferable to use rosin-treated particles obtained by treating one or more particles such as the above coloring pigments, luster pigments, fluorescent pigments, and coloring resin particles with a rosin compound.

Examples of rosin compounds that can be used to obtain rosin-treated particles include unmodified rosins such as wood rosin, gum rosin, and tall oil rosin; polymerized rosins, disproportionated rosins, stabilized rosins, and hydrogenated rosins obtained by modifying these unmodified rosins, for example, by polymerization, disproportionation, stabilization, and hydrogenation; chemically-modified rosins and rosin derivatives into which various functional groups are introduced, such as maleated rosins, fumarated rosins, rosin esters, rosin amines, and rosin amides; rosin-modified resins such as rosin-modified ester resins, rosin-modified acrylic resins, rosin-modified alkyd resins, rosin-modified maleic acid resins, rosin-modified phenolic resins, rosin-modified polyester resins, rosin-modified polyamide resins, and rosin-modified fumaric acid resins; and metal salts of these various rosin compounds, and one of them or a mixture of two or more of them can be used. As the rosin compound, a rosin acid contained in naturally occurring rosin can be used. The rosin acid here is a compound or mixture composed of at least one selected from abietic acid, abietic acid salts, dihydroabietic acid, dihydroabietic acid salts, neoabietic acid, neoabietic acid salts, dehydroabietic acid, dehydroabietic acid salts, tetrahydroabietic acid, tetrahydroabietic acid salts, palustric acid, palustrates, levopimaric acid, levopimaric acid salts, pimaric acid, pimaric acid salts, isopimaric acid, isopimaric acid salts, citronellic acid, and citronellic acid salts, and may be extracted from natural rosin or may be synthesized. The salt contained in the rosin acid is preferably a metal salt, more preferably an alkaline-earth metal salt, particularly preferably a calcium salt.

In view of, for example, dispersion stability and fluidity, the particles used have an average particle size of 0.001 to 100 μm, preferably 0.01 to 50 μm, more preferably 0.05 to 5 μm, and a BET specific surface area of 1 to 350 $m^2/g$, preferably 10 to 70 $m^2/g$, more preferably 20 to 50 $m^2/g$.

The rosin-treated particles can be prepared, for example, by adding a rosin compound to a pigment paste and mixing them; adding a powdery rosin compound to dried pigment particles and mixing them; mixing an aqueous slurry of a pigment with a rosin soap (or an aqueous alkaline solution of rosin) and then adding an alkaline-earth metal salt, an acid, or the like to the mixture to precipitate a rosin-insoluble salt or rosin free acid on the surface of the pigment; mixing an alkali metal salt of an unlaked dye with a rosin soap (or an aqueous alkaline solution of rosin) and adding an alkaline-earth metal salt or the like to the mixture to lake the dye while precipitating a rosin on the surface; and mixing a mixture of a dye and a metal salt that can couple to each other with a mixture of a coupling component and a rosin soap (or an aqueous alkaline solution of rosin) to achieve coupling, thereby achieving laking and rosin treatment.

In view of, for example, dispersion stability and fluidity, the rosin content in the rosin-treated particles is typically 0.1 to 50 parts by mass, preferably 0.5 to 30 parts by mass, more preferably 1 to 20 parts by mass, based on 100 parts by mass of the rosin-treated particles.

Presumably, the rosin-treated particles accelerate plasma curing of an ink film, with the rosin present on the particle surface serving as the starting point of plasma curing reaction.

The colorant is contained preferably, but not necessarily, in an amount of about 0 to 33 mass % based on the total mass of the ink composition for plasma curing according to the present invention and in an amount of about 0 to 99 mass % based on the total mass of the additive for an ink composition for plasma curing according to the present invention.

(Extender Pigment)

Any extender pigment can be used as long as it is an extender pigment that has hitherto been used in the preparation of ink compositions. The extender pigment may be in the form of powder or a dispersion in an appropriate solvent, and one extender pigment or a mixture of two or more extender pigments may be used.

Examples include talc, mica, barium sulfate, clay, calcium carbonate, kaolinite (kaolin), silicon oxide, bentonite, heavy calcium carbonate, barium carbonate, zirconia, and alumina.

The extender pigment used has an average particle size of 0.001 to 100 μm, preferably 0.01 to 50 μm, more preferably 0.05 to 5 μm, and a BET specific surface area of 1 to 350 $m^2/g$, preferably 10 to 70 $m^2/g$, more preferably 20 to 50 $m^2/g$.

It is also preferable to use rosin-treated particles obtained by treating particles of one or more of the above extender pigments with a rosin compound.

As the rosin compound, the above rosin compound used in forming the above rosin-treated colorant can be used.

In view of, for example, dispersion stability and fluidity, the particles used have an average particle size of 0.001 to 100 μm, preferably 0.01 to 50 μm, more preferably 0.05 to 5 μm, and a BET specific surface area of 1 to 350 $m^2/g$, preferably 10 to 70 $m^2/g$, more preferably 20 to 50 $m^2/g$.

The rosin-treated particles obtained by treating an extender pigment with a rosin compound may be a commercially available product or may be prepared by a known method.

Examples of commercially available products that can be used include NEOLIGHT (rosin-treated calcium carbonate manufactured by Takehara Kagaku Kogyo Co., Ltd.) and HAKUENKA (rosin-treated calcium carbonate manufactured by Shiraishi Calcium Kaisha, Ltd.).

The rosin-treated particles can be prepared, for example, by adding rosin to a pigment paste and mixing them; adding powdery rosin to dried pigment particles and mixing them; and mixing an aqueous slurry of a pigment with a rosin soap (or an aqueous alkaline solution of rosin) and then adding an alkaline-earth metal salt, an acid, or the like to the mixture to precipitate a rosin-insoluble salt or rosin free acid on the surface of the pigment.

In view of, for example, dispersion stability and fluidity, the rosin content in the rosin-treated particles is typically 0.1 to 50 parts by mass, preferably 0.5 to 30 parts by mass, more preferably 1 to 20 parts by mass, based on 100 parts by mass of the rosin-treated particles.

Presumably, the rosin-treated particles accelerate plasma curing of an ink film, with the rosin present on the particle surface serving as the starting point of plasma curing reaction.

The extender pigment is contained preferably, but not necessarily, in an amount of about 0 to 33 mass % based on the total mass of the ink composition for plasma curing according to the present invention and in an amount of about 0 to 99 mass % based on the total mass of the additive for an ink composition for plasma curing according to the present invention.

(Dispersant)

As the dispersant, for example, an anionic dispersant, a cationic dispersant, an amphoteric dispersant, or a nonionic dispersant may be used. Alternatively, a high-molecular-weight compound, a low-molecular-weight compound (surfactant), or a pigment derivative may be used.

Examples of dispersants that can be used include polyvinyl alcohol compounds, polyvinylpyrrolidone compounds, hydroxyl-containing carboxylic acid esters, high-molecular-weight polycarboxylic acid salts, naphthalenesulfonic acid formalin condensate salts, polyoxyethylene alkyl phosphoric acid esters, long-chain polyaminoamide-high-molecular-weight acid ester salts, long-chain polyaminoamide-polar acid ester salts, polyester polyamine, stearylamine acetate, high-molecular-weight unsaturated acid esters, polyoxyethylene nonylphenyl ether, urethane compounds such as modified polyurethane, polyester amine, fatty acid amine, polycarboxylic acid, polyester amine salts, multichain nonionic polymers, (modified) acrylic resins (salts) such as acrylic acid-acrylic acid ester copolymers, styrene-acrylic resins (salts) such as styrene-acrylic acid copolymers, styrene-methacrylic acid copolymers, styrene-methacrylic acid-acrylic acid ester copolymers, styrene-α-methylstyrene-acrylic acid copolymers, and styrene-α-methylstyrene-acrylic acid-acrylic acid ester copolymers, styrene-maleic acid copolymers (salts), styrene-maleic anhydride copolymers (salts), vinylnaphthalene-acrylic acid copolymers (salts), polyethyleneimine compounds, polyallylamine compounds, polyoxyethylene alkyl ether compounds, polyoxyethylene diester compounds, polyether phosphoric acid compounds, polyester phosphoric acid compounds, and sorbitan aliphatic ester compounds.

Examples of commercially available dispersants include AJISPER (trade name, manufactured by Ajinomoto Fine-Techno Co., Inc.), Disperbyk (trade name, manufactured by BYK-Chemie), EFKA (trade name, manufactured by BASF), SOLSPERSE (trade name, manufactured by Lubrizol Japan), TEGO (trade name, Evonik), DEMOL (trade name, manufactured by Kao Corporation), HOMOGENOL (trade name, manufactured by Kao Corporation), DISPARLON (trade name, manufactured by Kusumoto Chemicals, Ltd.), DISCOL (trade name, manufactured by DKS Co., Ltd.), and Hypermer (trade name, manufactured by Croda Japan).

These dispersants can be used alone or as a mixture of two or more.

The amount of dispersant added may be any amount that allows various particles, such as the above pigments, to be dispersed in the ink composition for plasma curing or the additive for an ink composition for plasma curing according to the present invention, and is typically such that the amount of dispersant is 10 to 500 parts by mass based on 100 parts by mass of a material to be dispersed.

The dispersant is contained preferably, but not necessarily, in an amount of about 0 to 33 mass % based on the total mass of the ink composition for plasma curing according to the present invention and in an amount of about 0 to 99 mass % based on the total mass of the additive for an ink composition for plasma curing according to the present invention.

(Surfactant)

Examples of surfactants include anionic surfactants such as dialkyl sulfosuccinic acid salts, alkylnaphthalene sulfonic acid salts, and fatty acid salts; nonionic surfactants such as polyoxyethylene alkyl ethers, polyoxyethylene alkyl allyl ethers, acetylene glycols, and polyoxyethylene-polyoxypropylene block copolymers; cationic surfactants such as alkylamine salts and quaternary ammonium salts; amphoteric surfactants such as compounds having, as hydrophilic groups, an acid structure (anionic moiety) and a quarternary ammonium (cationic moiety) structure in their molecules; fluorosurfactants such as organofluoro compounds; and silicone surfactants such as polysiloxane compounds.

The surfactant is contained preferably, but not necessarily, in an amount of about 0 to 33 mass % based on the total mass of the ink composition for plasma curing according to the present invention and in an amount of about 0 to 99 mass % based on the total mass of the additive for an ink composition for plasma curing according to the present invention.

(Dry-Curing Accelerator)

The ink composition for plasma curing and/or the additive for an ink composition for plasma curing according to the present invention may include a dry-curing accelerator that is not "the photocatalyst compound and/or the composite of a metal component and a photocatalyst compound" described above. The dry-curing accelerator may be, for example, a metal dryer.

Any metal dryer that has hitherto been used in the preparation of ink compositions can be used as long as it is a material that promotes oxidative polymerization of the ink composition for plasma curing. One metal dryer may be used alone, or two or more metal dryers may be used in combination.

Examples include borates and metal salts (metallic soaps) of metals, including transition metals such as cobalt, manganese, lead, iron, zinc, calcium, zirconium, and copper, alkaline-earth metals such as calcium, and rare-earth elements such as cerium, and carboxylic acids, including acetic acid, propionic acid, butyric acid, isopentanoic acid, hexanoic acid, 2-ethylbutyric acid, naphthenic acid, octylic acid, nonanoic acid, decanoic acid, 2-ethylhexanoic acid, isooctanoic acid, isononanoic acid, lauric acid, palmitic acid, stearic acid, oleic acid, linoleic acid, neodecanoic acid, versatic acid, cekanoic acid, tall oil fatty acid, dimethylhexanoic acid, 3,5,5,-trimethylhexanoic acid, dimethyloctanoic acid, resin acid, tung oil fatty acid, linseed oil fatty acid, and soybean oil fatty acid. To further improve drying properties, peroxides may also be added.

The dry-curing accelerator is contained preferably, but not necessarily, in an amount of about 0 to 10 mass % based on the total mass of the ink composition for plasma curing according to the present invention and in an amount of about 0 to 99 mass % based on the total mass of the additive for an ink composition for plasma curing according to the present invention.

(Antifriction Agent)

Any antifriction agent that has hitherto been used in the preparation of ink compositions can be used. One antifriction agent may be used alone, or two or more antifriction agents may be used in combination. Examples include natural and synthetic waxes including vegetable waxes such as carnauba and Japan wax, animal waxes such as spermaceti wax and lanolin, and petroleum waxes such as montan wax; and synthetic waxes such as polyethylene (PE) wax, polypropylene (PP) wax, polytetrafluoroethylene (PTFE) wax, hard fine particles of polystyrene, polystyrene rubber, and the like, paraffin wax, carnauba wax, beeswax, microcrystalline wax, oxidized polyethylene wax, and amide wax.

The antifriction agent is contained preferably, but not necessarily, in an amount of about 0 to 10 mass % based on the total mass of the ink composition for plasma curing according to the present invention and in an amount of about 0 to 99 mass % based on the total mass of the additive for an ink composition for plasma curing according to the present invention.

(Gelling Agent)

Any gelling agent that has hitherto been used in the preparation of ink compositions can be used. One gelling agent may be used alone, or two or more gelling agents may be used in combination. Examples include gelling agents such as metal chelate compounds, organic acid metal salts (metallic soaps), and metallic soap oligomers.

Examples of gelling agents include salts of organic acids such as stearic acid, lauric acid, ricinoleic acid, octylic acid, and naphthenic acid and metals such as lithium, sodium, potassium, aluminum, calcium, cobalt, iron, manganese, magnesium, lead, zinc, and zirconium (specifically, manganese naphthenate, aluminum octoate, zinc stearate, aluminum stearate, etc.); aluminum chelating agents such as aluminum triisopropoxide, aluminum tributoxide, aluminum dipropoxide monoacetyl acetate, aluminum diisopropoxide monoethyl acetoacetate, aluminum dibutoxide monoacetyl acetate, and aluminum triacetyl acetate; titanium chelating agents such as tetraisopropoxy titanium, tetrabutoxy titanium, and dipropoxy bis(acetylacetonate) titanium; zirconium chelating agents such as tetrabutoxy zirconium; and polyisocyanates such as tolylene diisocyanate, diphenyl diisocyanate, hexamethylene diisocyanate, xylylene diisocyanate, and isophorone diisocyanate. Two or more of them may be used as a mixture.

When a gelled varnish prepared using a gelling agent is used to prepare an ink composition, the ink composition can be advantageously provided with moderate viscoelasticity.

The gelling agent is contained preferably, but not necessarily, in an amount of about 0 to 5 mass % based on the total mass of the ink composition for plasma curing according to the present invention and in an amount of about 0 to 99 mass % based on the total mass of the additive for an ink composition for plasma curing according to the present invention.

(Viscosity Modifier)

Any viscosity modifier that has hitherto been used in the preparation of ink compositions can be used. One viscosity modifier may be used alone, or two or more viscosity modifiers may be used in combination.

Examples of viscosity modifiers include the above-described animal or vegetable oils and/or the above-described animal or vegetable oil derivatives, the above-described liquid components, celluloses, polyvinyl alcohol, cellulose derivatives such as carboxymethylcellulose (salt) and methylcellulose, polyamine, polyimine, starches such as starch glycolate and starch phosphate, alginic acid salts, propylene glycol alginate esters, glycerol fatty acid esters, sucrose fatty acid esters, sorbitan fatty acid esters, polyacrylic acids (salts), and alkylene glycol fatty acid esters.

The viscosity modifier is contained preferably, but not necessarily, in an amount of about 0 to 5 mass % based on the total mass of the ink composition for plasma curing according to the present invention and in an amount of about 0 to 99 mass % based on the total mass of the additive for an ink composition for plasma curing according to the present invention.

(Polymerization Inhibitor)

When a polymerizable compound having an ethylenically unsaturated double bond is included in the ink composition for plasma curing and/or the additive for an ink composition for plasma curing according to the present invention, a polymerization inhibitor may be included, whereby the ink composition can be provided with, for example, storage stability and viscosity stability over time. Any polymerization inhibitor that has hitherto been used in the preparation of ink compositions can be used. One polymerization inhibitor may be used alone, or two or more polymerization inhibitors may be used in combination.

Examples of polymerization inhibitors include phenolic compounds such as hydroquinone, methylhydroquinone, p-t-butylcatechol, 2-t-butylhydroquinone, 2,6-di-t-butyl-4-methylphenol, 2,5-di-t-butylhydroquinone, trimethylhydroquinone, methoxyhydroquinone, 4-methoxyphenol, butylhydroxytoluene, p-benzoquinone, 2,5-di-t-butylbenzoquinone, and naphthoquinone; nitrosamine compounds such as tocopherol acetate and N-nitrosophenylhydroxylamine salts; and benzotriazole, phenothiazine compounds, hindered amine compounds, phosphorus compounds, and N-oxyl compounds.

The polymerization inhibitor is contained preferably, but not necessarily, in an amount of about 0 to 5 mass % based on the total mass of the ink composition for plasma curing according to the present invention and in an amount of about 0 to 99 mass % based on the total mass of the additive for an ink composition for plasma curing according to the present invention.

(Antioxidant)

Any antioxidant that has hitherto been used in the preparation of ink compositions can be used. One antioxidant may be used alone, or two or more antioxidants may be used in combination.

Examples include phenolic antioxidants, amine antioxidants, sulfur antioxidants, and phosphorus antioxidants.

The antioxidant is contained preferably, but not necessarily, in an amount of about 0 to 5 mass % based on the total mass of the ink composition for plasma curing according to the present invention and in an amount of about 0 to 99 mass % based on the total mass of the additive for an ink composition for plasma curing according to the present invention.

(Antimicrobial and Antifungal Agent)

Any antimicrobial and antifungal agent that has hitherto been used in the preparation of ink compositions can be used. One antimicrobial and antifungal agent may be used alone, or two or more antimicrobial and antifungal agents may be used in combination.

Examples include sodium dehydroacetate, sodium benzoate, sodium pyridinethione-1-oxide, p-hydroxybenzoic acid ethyl ester, 1,2-benzisothiazolin-3-one, and salts thereof.

The antimicrobial and antifungal agent is contained preferably, but not necessarily, in an amount of about 0 to 3 mass % based on the total mass of the ink composition for plasma curing according to the present invention and in an amount of about 0 to 99 mass % based on the total mass of the additive for an ink composition for plasma curing according to the present invention.

(Silane Coupling Agent)

Examples of silane coupling agents include (meth)acrylic silane coupling agents such as γ-methacryloxypropyltrimethoxysilane; vinyl silane coupling agents such as vinyltris(β-methoxyethoxy)silane, vinylethoxysilane, and vinyltrimethoxysilane; epoxy silane coupling agents such as β-(3,4-epoxycyclohexyl)ethyltrimethoxysilane, β-(3,4-epoxycyclohexyl)methyltrimethoxysilane, β-(3,4-epoxycyclohexyl)ethyltriethoxysilane, β-(3,4-epoxycyclohexyl)methyltriethoxysilane, γ-glycidoxypropyltrimethoxysilane, and γ-glycidoxypropyltriethoxysilane; amino silane coupling agents such as N-β(aminoethyl) γ-aminopropyltrimethoxysilane, N-β(aminoethyl) γ-aminopropyltriethoxysilane, N-β(aminoethyl) γ-aminopropylmethyldiethoxysilane, γ-aminopropyltriethoxysilane, γ-aminopropyltrimethoxysilane, N-phenyl-γ-aminopropyltrimethoxysilane, and N-phenyl-γ-aminopropyltriethoxysilane; mercaptosilanes such as γ-mercaptopropyltrimethoxysilane and γ-mercaptopropyltriethoxysilane; and imidazole silane.

The silane coupling agent is contained preferably, but not necessarily, in an amount of about 0 to 10 mass % based on the total mass of the ink composition for plasma curing according to the present invention and in an amount of about 0 to 99 mass % based on the total mass of the additive for an ink composition for plasma curing according to the present invention.

[Method for Producing Ink Composition for Plasma Curing and Additive for Ink Composition for Plasma Curing]

When the ink composition for plasma curing and the additive for an ink composition for plasma curing according to the present invention are produced using the above-described components, a method known in the art can be used.

Examples of such a method include a method in which all or part of the components constituting the ink composition for plasma curing or the additive for an ink composition for plasma curing is mixed using a known or commonly used stirring and dispersing means.

In the mixing, for example, various stirring and dispersing devices including mixers such as paint shakers, butterfly mixers, planetary mixers, pony mixers, dissolvers, tank mixers, homo-mixers, and homo-dispers; mills such as attritors, roll mills, sand mills, ball mills, bead mills, line mills, ultrasonic mills, dyno-mills, and shot mills; kneaders; mixing kneaders; and high-pressure impinging dispersers may be used, and such stirring and dispersing devices need not be used. A single stirring and dispersing device may be used to perform a stirring and dispersing treatment once or multiple times, or two or more stirring and dispersing devices may be used in combination to perform the stirring and dispersing treatment multiple times.

If necessary, when the stirring and dispersing treatment is performed multiple times, a liquid component or various additive components may be further added, and the resultant may be stirred and dispersed using the above stirring and dispersing device.

The production of the ink composition for plasma curing and/or the additive for an ink composition for plasma curing may be performed under heating, under cooling, or at room temperature, as required. The production may be performed in an atmosphere such as an inert gas atmosphere and need not be performed in a gas atmosphere.

The ink composition for plasma curing according to the present invention can be obtained, for example, by placing the above-described raw materials in a container, performing premixing by thoroughly mixing them, optionally using any of the above-described stirring and dispersing devices, optionally under heating or cooling, and optionally in a particular atmosphere, to prepare a varnish, and then mixing together a required amount of the varnish and the above-described ink raw materials to sufficiently perform a stirring and dispersing treatment.

In the present invention, the photocatalyst compound and/or the composite of a metal component and a photocatalyst compound may be added during the premixing or during the subsequent ink composition production.

[Substrate to which Ink Composition for Plasma Curing is Applied]

The substrate to which the ink composition for plasma curing according to the present invention is applied is not particularly limited. Examples include papers such as high-quality paper, coated paper, art paper, simili paper, thin paper, and thick paper; films and sheets of resins including polyesters such as PET and polylactic acid, (meth)acrylic resin, vinyl chloride resin, vinylidene chloride resin, polyvinyl alcohol, polyolefins such as polyethylene and polypropylene, polyacrylonitrile, ethylene-vinyl acetate copolymers, ethylene-vinyl alcohol copolymers, ethylene-methacrylic acid copolymers, polyamide, and polycarbonate; cellophane; metals such as aluminum foil; inorganic materials such as glass, wood, and gypsum board; composite materials of two or more thereof; and other various substrates used as printing substrates.

[Ink Composition for Plasma Curing to which Additive for Ink Composition for Plasma Curing is Added]

The ink composition for plasma curing to which the additive for an ink composition for plasma curing according to the present invention is added is not particularly limited as long as it is an ink composition whose printed film is dry-cured with a plasma. For example, the binder, the animal or vegetable oil and/or the animal or vegetable oil derivative, and/or the conjugated polyene compound described above optionally included in the ink composition for plasma curing according to the present invention may be included. Furthermore, the other components such as liquid components and various additives may be included.

[Printing Method Usable for Ink Composition for Plasma Curing]

The ink composition for plasma curing according to the present invention can be used without limitation for various printing methods, such as offset printing, which uses dampening water, dry offset printing, which uses no dampening water, gravure printing, flexographic printing, screen printing, pad printing, electrophotographic printing, and inkjet printing.

[Plasma/Plasma Irradiation Device]

The ink composition for plasma curing according to the present invention is applied to the above various printing methods and has the ability to dry-cure upon irradiation with a plasma, which is an ionized gas. More specifically, curable components and the like included in the ink composition are polymerized upon plasma irradiation, and a film of the ink composition for plasma curing formed by printing is dry-cured. When a sticky ink composition on a surface of a printed material is irradiated with a plasma immediately after printing, the ink composition is instantaneously cured to become dry (tack-free).

As the plasma for use in the present invention, plasmas generated under various conditions can be used. Of these, atmospheric-pressure plasma, which is easy to handle and advantageous in terms of devices and cost, is preferred.

Atmospheric-pressure plasma is a plasma generated under substantially atmospheric pressure. Substantially atmospheric pressure means, in addition to atmospheric pressure, a pressure state not excessively pressurized or excessively decompressed and refers to a pressure range, practically, from 0.1 to 10 atmospheres, preferably, from 0.7 to 1.5 atmospheres. The temperature at which a plasma is generated is not particularly limited, and is preferably about 50° C. or lower in view of, for example, handleability.

Since there is no need to reduce pressure (create a vacuum system) when the plasma is generated, the cost of equipment and the cost of treatment can be reduced. Also, since treatment can be performed at room temperature, the shape and properties of target materials will not be affected.

The plasma temperature of atmospheric-pressure plasma may be any temperature from high temperature to low temperature. It is more preferable to use an atmospheric-pressure plasma controlled at a temperature suitable, for example, for reaction, and, for example, atmospheric-pressure low-temperature plasma is preferred in view of, for example, damage to substrates.

The plasma temperature is not particularly limited as long as it is a temperature suitable, for example, for reaction, and is preferably about 100° C. or lower, particularly preferably 0° C. to 100° C., in view of, for example, handleability. For the temperature control of atmospheric-pressure plasma, a method described in Japanese Patent No. 4611409 can be used, for example.

The plasma used to cure the ink composition for plasma curing according to the present invention is generated as a result of ionization of a discharge gas present in an electric field. The plasma may be any plasma that has high energy capable of causing a chemical reaction and cures (polymerizes) the ink composition.

The plasma for use in the present invention need not be generated by a discharge that causes a current to flow between electrodes spaced from each other, and may be generated by various methods. A scientifically defined plasma can be used without limitation, and any gas that contains charged particles generated as a result of ionization and that is in an electrically neutral or substantially neutral state where the number of ions and the number of electrons are the same or substantially the same may be used.

Examples of discharge gases used in plasma generation include, but are not limited to, air, oxygen, carbon dioxide, nitrogen, noble gases (e.g., argon, helium, and neon), hydrogen, halogens (fluorine and chlorine), gases such as water vapor, and mixed gases containing two or more selected from this group. Preferred are air, oxygen, nitrogen, carbon dioxide, and mixed gases containing two or more selected from this group. Particularly preferred are air, oxygen, nitrogen, and mixed gases containing two or more selected from this group.

When plasma irradiation and UV irradiation are used in combination, a mixture of the above discharge gas and a small amount of a gas that readily emits ultraviolet light at the time of atmospheric-pressure plasma generation, such as argon, krypton, or xenon, can be used as a discharge gas used in atmospheric-pressure plasma generation.

The plasma irradiation device used may be a device having the following mechanism: a current is applied to electrodes connected to a high-frequency power source and spaced from each other to create a discharge state; the above discharge gas is introduced and passed between the electrodes (actively caused to flow between the electrodes) to convert into a plasma; and the plasma is released toward an irradiation target. Examples of such devices include direct-type devices, remote-type devices, and combined-type devices, depending on the form of plasma irradiation.

A direct-type device performs plasma irradiation in such a manner that a printed substrate is passed between electrodes to which a voltage is applied (i.e., passed through a discharge space). High reactivity due to a freshly generated plasma is expected. The conditions in the case where a direct-type plasma irradiation device is used are not particularly limited.

The treatment voltage is freely set based on, for example, the gas species of discharge gas, treatment current, treatment frequency, interelectrode distance, substrate treatment speed, discharge gas flow rate, and irradiation distance. For example, the treatment voltage is 10 to 1000 V, preferably 20 to 600 V, more preferably 100 to 500 V, but is not particularly limited.

The treatment current is freely set based on, for example, the gas species of discharge gas, treatment voltage, treatment frequency, interelectrode distance, substrate treatment speed, discharge gas flow rate, and irradiation distance. For example, the treatment current is 0.001 to 1000 A, preferably 0.01 to 500 A, more preferably 0.1 to 100 A, but is not particularly limited.

The treatment frequency is freely set based on, for example, the gas species of discharge gas, treatment voltage, treatment current, interelectrode distance, substrate treatment speed, discharge gas flow rate, and irradiation distance. For example, the treatment frequency is 0.001 to 1000 kHz, preferably 0.01 to 500 kHz, more preferably 0.05 to 100 kHz, but is not particularly limited.

The interelectrode distance is freely set based on, for example, the gas species of discharge gas, treatment voltage, treatment current, treatment frequency, substrate treatment speed, discharge gas flow rate, and irradiation distance. For example, the interelectrode distance is 0.1 to 50 mm, preferably 0.5 to 25 mm, more preferably 0.5 to 10 mm, but is not particularly limited.

The substrate treatment speed (substrate passage speed) is freely set based on, for example, the gas species of discharge gas, treatment voltage, treatment current, treatment frequency, interelectrode distance, discharge gas flow rate, and irradiation distance. For example, the substrate treatment speed is 0.01 to 7000 mm/s, preferably 0.1 to 3000 mm/s, more preferably 1 to 2000 mm/s, but is not particularly limited.

The discharge gas flow rate is freely set based on, for example, the gas species of discharge gas, treatment voltage, treatment current, treatment frequency, interelectrode distance, substrate treatment speed, and irradiation distance. For example, the discharge gas flow rate is 0.01 to 100 l/min, preferably 0.1 to 30 l/min, more preferably 0.1 to 20 l/min, but is not particularly limited.

A remote-type device performs plasma irradiation in such a manner that a plasma generated at a different place away from a treatment target is transported to the treatment target with the flow of plasma gas. Plasma irradiation can be performed without causing much damage to a substrate. The conditions in the case where a remote-type plasma irradiation device is used are not particularly limited.

The treatment voltage is freely set based on, for example, the gas species of discharge gas, treatment current, treatment frequency, interelectrode distance, substrate treatment speed, discharge gas flow rate, and irradiation distance. For example, the treatment voltage is 10 to 1000 V, preferably 20 to 600 V, more preferably 100 to 500 V, but is not particularly limited.

The treatment current is freely set based on, for example, the gas species of discharge gas, treatment voltage, treatment frequency, interelectrode distance, substrate treatment speed, discharge gas flow rate, and irradiation distance. For example, the treatment current is 0.001 to 1000 A, preferably 0.01 to 500 A, more preferably 0.1 to 100 A, but is not particularly limited.

The treatment frequency is freely set based on, for example, the gas species of discharge gas, treatment voltage, treatment current, interelectrode distance, substrate treatment speed, discharge gas flow rate, and irradiation distance. For example, the treatment frequency is 0.001 to 1000 kHz, preferably 0.01 to 500 kHz, more preferably 0.05 to 100 kHz, but is not particularly limited.

The interelectrode distance is freely set based on, for example, the gas species of discharge gas, treatment voltage, treatment current, treatment frequency, substrate treatment speed, discharge gas flow rate, and irradiation distance. For example, the interelectrode distance is 0.1 to 50 mm, preferably 0.5 to 25 mm, more preferably 0.5 to 10 mm, but is not particularly limited.

The substrate treatment speed (substrate passage speed) is freely set based on, for example, the gas species of discharge gas, treatment voltage, treatment current, treatment frequency, interelectrode distance, discharge gas flow rate, and irradiation distance. For example, the substrate treatment speed is 0.01 to 7000 mm/s, preferably 0.1 to 3000 mm/s, more preferably 1 to 2000 mm/s, but is not particularly limited.

The discharge gas flow rate is freely set based on, for example, the gas species of discharge gas, treatment voltage, treatment current, treatment frequency, interelectrode distance, substrate treatment speed, and irradiation distance. For example, the discharge gas flow rate is 0.01 to 1000 l/min, preferably 5 to 300l/min, more preferably 5 to 100 l/min, but is not particularly limited.

The irradiation distance (substrate-to-irradiation port distance) is freely set based on, for example, the gas species of discharge gas, treatment voltage, treatment current, treatment frequency, interelectrode distance, substrate treatment speed, and discharge gas flow rate. For example, the irradiation distance is 0.1 to 10000 mm, preferably 0.3 to 5000 mm, more preferably 1 to 2000 mm, but is not particularly limited.

When a plasma treatment is performed using a direct-type and/or remote-type device and the irradiation distance (substrate-to-irradiation port distance) is short (typically less than 100 mm, although varying according to, for example, the gas species of discharge gas, treatment voltage, treatment current, treatment frequency, interelectrode distance, substrate treatment speed, and discharge gas flow rate), dry-curing presumably occurs mainly due to the reaction-promoting action of a light-emitting part (excitation light part) of a plasma-modified gas ejected from a plasma irradiation port. Here, the light-emitting part is a part that can be visually observed under dark conditions as a flame-shaped light-emitting part from the irradiation port and that includes radicals with relatively high activity and the like.

When a plasma treatment is performed using a direct-type and/or remote-type device and the irradiation distance (substrate-to-irradiation port distance) is long (typically 100 mm or more, although varying according to, for example, the gas species of discharge gas, treatment voltage, treatment current, treatment frequency, interelectrode distance, substrate treatment speed, and discharge gas flow rate), dry-curing presumably occurs mainly due to the reaction-promoting action of a quenched-light part of a plasma-modified gas ejected from a plasma irradiation port. Here, the quenched-light part refers to a region of the plasma-modified gas flow that is downstream of the above light-emitting part. Specifically, the quenched-light part is a part including radicals with relatively low activity and the like generated during plasma modification, radicals and the like contained in a gas remodified in the light-emitting part, or radicals and the like contained, for example, in an ambient atmospheric gas (e.g., air) activated by the light-emitting part and/or the quenched-light part. Here, when the irradiation distance is long, a member of a desired shape, such as a cylindrical member or a plate-like member, is typically provided at a desired position of the plasma irradiation device, whereby a gas modified with a plasma can be converged, concentrated, and collected to jet (apply) the plasma-modified gas toward a substrate.

In general, as the irradiation distance (printed substrate-to-irradiation port distance) decreases, dry-curing of an ink composition coating often becomes dominant.

The ink composition for plasma curing according to the present invention exhibits high reactivity when irradiated with a plasma. Regardless of whether a plasma generated using a direct-type device and/or a plasma generated using a remote-type device is used, the dry-curing start time of an ink composition coating is early, and at the same time, good dry-curability is exhibited.

<Printing Method Using Ink Composition for Plasma Curing>

A printing method using the ink composition for plasma curing according to the present invention includes a printing step of printing the ink composition for plasma curing on a substrate, and a plasma irradiation step of irradiating a film of the ink composition for plasma curing present on a surface of the substrate that has been through the printing step with a plasma to dry-cure and fix the film.

The printing step is a step of performing printing on a substrate by using the ink composition for plasma curing according to the present invention. The substrate to be printed may be of any shape such as sheet-like or three-dimensional, and may be of any material such as paper, plastic, metal, glass, ceramic, or wood. Preferred examples include paper, plastic films, metal plates, and glass.

As a printing means, various conventionally known printing means can be used without limitation. For example, various printing means such as offset printing, which uses dampening water, dry offset printing, which uses no dampening water, gravure printing, flexographic printing, screen printing, pad printing, electrophotographic printing, and inkjet printing are used, and preferably, offset printing, screen printing, and inkjet printing are used.

In particular, when offset printing is used, sheet-fed printing or offset rotary printing is used, for example. When offset printing is performed, not only standard offset printing using dampening water but also dry offset printing may be employed. On the substrate that has been through the printing step, an image is formed by the ink composition in an undried state, and the substrate is subjected to the plasma irradiation step.

In the plasma irradiation step, the substrate that has been through the printing step is irradiated with a plasma to cure and fix the ink composition present on the surface of the substrate.

As the plasma, plasmas generated under various conditions can be used. Of these, atmospheric-pressure plasma, which is easy to handle and advantageous in terms of devices and cost, is preferred. The plasma irradiation device used may be a direct-type, remote-type, or combined-type plasma irradiation device.

Here, the plasma and the plasma irradiation device may be those described in [Plasma/plasma irradiation device] above.

The ink composition according to the present invention is highly reactive with plasma irradiation and thus can be sufficiently cured even with a plasma generated from a remote-type plasma generation device. Thus, from the viewpoint of prevention of damage to the substrate and prevention of jamming of the substrate due to upward and downward flapping caused during transport of the substrate, it is preferable to use, in this step, a plasma generated from a remote-type plasma generation device.

When a plasma generated from a direct-type and/or remote-type plasma generation device is used to cure the ink composition, the irradiation port for the plasma (plasma gas ejection port) is preferably arranged in a line along the width direction of the substrate. The irradiation port (plasma gas ejection port) may be constituted by a plurality of dot-type irradiation ports (plasma gas ejection ports) arranged in a line along the width direction of the substrate. The irradiation port may also be constituted by a linear-type irradiation port (plasma gas ejection port) arranged along the width direction of the substrate. To adjust the curability of the ink composition, the temperature of the plasma applied to the ink composition may be adjusted using, for example, a method as described in Japanese Patent No. 4611409.

Examples of discharge gases used in plasma generation are the same as those described in [Plasma/plasma irradiation device] above.

The discharge gas is converted to a plasma as it passes between electrodes connected to a high-frequency power source and being in a discharge state, and is released from the above release port toward the surface of the substrate.

[Applications of Ink Composition for Plasma Curing]

When containing a coloring component, the ink composition for plasma curing according to the present invention can be used in applications of printing of, for example, images and letters using various printing methods. When containing no coloring components, the ink composition can be used in applications of, for example, clear coating and security printing (transparent printing). The ink composition is useful for various types of printing such as typical printed materials for delivery of information, appreciation, etc., printing of packages, marking printing, and printing on three-dimensional objects.

EXAMPLES

The ink composition and/or the additive for an ink composition according to the present invention will now be described in more detail with reference to examples. The present invention is not limited to these examples.

[Preparation of Varnish]

In a reaction vessel, 40.5 parts by mass of a rosin-modified phenolic resin, 52.7 parts by mass of soybean oil, and 5.2 parts by mass of an alkyd resin were placed and heated with stirring. Furthermore, 0.6 parts by mass of aluminum ethyl acetoacetate diisopropylate (ALCH; gelling agent) was placed in the reaction vessel and heated with stirring to prepare Varnish 1.

Examples 1 to 18; Comparative Example 1

[Preparation of Ink Composition and Evaluation of Curability]

Fifty-five parts by mass of Varnish 1, 25 parts by mass of soybean oil, 17 parts by mass of a coloring pigment (indigo pigment), and a photocatalyst compound shown in Table 1 in an amount shown in Table 1 (parts by mass, in terms of photocatalyst compound content in ink composition) were combined and mixed together to prepare ink compositions of Examples 1 to 18.

Fifty-five parts by mass of Varnish 1, 25 parts by mass of soybean oil, and 17 parts by mass of a coloring pigment (indigo pigment) were combined and mixed together to prepare an ink composition of Comparative Example 1.

The results of evaluation of curability upon plasma irradiation of the ink compositions of Examples 1 to 18 and Comparative Example 1 are also shown in Table 1.

The evaluation of curability was performed as follows: 0.1 cc of each ink composition was transferred onto a polypropylene film (Polysame PC-8162 manufactured by Sekisui Seikei Co., Ltd.) with an RI color transfer machine, and using a remote-type plasma generation device, the color-transferred surface was irradiated with a plasma under the following irradiation conditions.

(Plasma Irradiation Conditions)
Gas species: air
Flow rate: 5 l/min
Irradiation port diameter: 1 mm
Irradiation distance: 4 mm The color-transferred surface of each ink composition was irradiated with a plasma for 1 to 10 seconds at one-second intervals. For each case, the color-transferred surface was rubbed with absorbent cotton to wipe off an uncured ink composition, and a plasma-curing start time and a cured coating diameter of a circularly cured part at the plasma-curing start time were measured.

Since the reactivity with the plasma increases toward the center of irradiation and decreases toward the periphery, the reactivity of each ink composition with the plasma can be evaluated by the cured diameter.

TABLE 1

|  |  | Example | | | | | | | | | | |
|---|---|---|---|---|---|---|---|---|---|---|---|
|  |  | 1 | 2 | 3 | 4 | 5 | 6 | 7 | 8 | 9 | 10 | 11 |
| Plasma irradiation distance (mm) |  | | | | | | 4 | | | | | |
| Photocatalyst compound | Titanium oxide 1 (parts by mass) | 0.05 | 0.10 | 0.20 | 0.50 | 1.00 | 5.00 | | | | | |
|  | Zinc oxide 1 (parts by mass) | | | | | | | 0.05 | 0.10 | 0.20 | 0.50 | 1.00 |
|  | Zinc oxide 2 (parts by mass) | | | | | | | | | | | |
| Curing properties | Curing start time (s) | 7 | 6 | 5 | 4 | 3 | 3 | 7 | 6 | 5 | 5 | 4 |
|  | Cured coating diameter (mm) | 10 | 9 | 8 | 10 | 10 | 12 | 10 | 9 | 8 | 9 | 9 |

|  |  | Example | | | | | | | Comparative Example |
|---|---|---|---|---|---|---|---|---|---|
|  |  | 12 | 13 | 14 | 15 | 16 | 17 | 18 | 1 |
| Plasma irradiation distance (mm) |  | | | | 4 | | | | |
| Photocatalyst compound | Titanium oxide 1 (parts by mass) | | | | | | | | — |
|  | Zinc oxide 1 (parts by mass) | 5.00 | | | | | | | — |
|  | Zinc oxide 2 (parts by mass) | | 0.05 | 0.10 | 0.20 | 0.50 | 1.00 | 5.00 | — |

TABLE 1-continued

| Curing properties | Curing start time (s) | 4 | 6 | 5 | 5 | 4 | 3 | 3 | 8 |
|---|---|---|---|---|---|---|---|---|---|
| | Cured coating diameter (mm) | 9 | 9 | 11 | 10 | 10 | 9 | 9 | 9 |

In Table 1,
Titanium oxide 1: anatase-type titanium oxide; purity, 98.9%; average particle size, 9 nm; specific surface area, 309.8 m$^2$/g
Zinc oxide 1: purity, 99.60%; average particle size, 100 nm
Zinc oxide 2: purity, 98.50%; average particle size, 70 nm Examples 19 to 36; Comparative Examples 2 to 7

[Preparation of Ink Composition and Evaluation of Curability]

Fifty-five parts by mass of Varnish 1, 25 parts by mass of soybean oil, 17 parts by mass of a coloring pigment (indigo pigment), and a photocatalyst compound shown in Table 2 (Titanium oxide 1, 2, or 3) in an amount shown in Table 2 (parts by mass, in terms of photocatalyst compound content in ink composition) were combined and mixed together to prepare ink compositions of Examples 19 to 36.

Fifty-five parts by mass of Varnish 1, 25 parts by mass of soybean oil, 17 parts by mass of a coloring pigment (indigo pigment), and a titanium oxide (Titanium oxide 4) having no photocatalytic activity in an amount shown in Table 2 (parts by mass, in terms of photocatalyst compound content in ink composition) were combined and mixed together to prepare ink compositions of Comparative Examples 2 to 7.

The results of evaluation of curability upon plasma irradiation of the ink compositions of Examples 19 to 36 and Comparative Examples 2 to 7 are also shown in Table 2.

The evaluation of curability was performed by the same measurement method under the same plasma irradiation conditions as in Examples 1 to 18.

TABLE 2

| | | Example | | | | | | | | | | | | |
|---|---|---|---|---|---|---|---|---|---|---|---|---|---|---|
| | | 19 | 20 | 21 | 22 | 23 | 24 | 25 | 26 | 27 | 28 | 29 | 30 | 31 |
| Plasma irradiation distance (mm) | | | | | | | | 4 | | | | | | |
| Photocatalyst compound | Titanium oxide 1 (parts by mass) | 0.05 | 0.10 | 0.15 | 0.20 | 0.50 | 1.00 | | | | | | | |
| | Titanium oxide 2 (parts by mass) | | | | | | | 0.05 | 0.10 | 0.15 | 0.20 | 0.50 | 1.00 | |
| | Titanium oxide 3 (parts by mass) | | | | | | | | | | | | | 0.05 |
| Titanium oxide 4 (parts by mass) | | | | | | | | | | | | | | |
| Curing properties | Curing start time (s) | 7 | 6 | 5 | 5 | 4 | 3 | 8 | 8 | 7 | 7 | 7 | 6 | 8 |
| | Cured coating diameter (mm) | 10 | 9 | 9 | 8 | 10 | 10 | 8 | 10 | 6 | 10 | 9 | 10 | 12 |

| | | Example | | | | | Comparative Example | | | | | |
|---|---|---|---|---|---|---|---|---|---|---|---|---|
| | | 32 | 33 | 34 | 35 | 36 | 2 | 3 | 4 | 5 | 6 | 7 |
| Plasma irradiation distance (mm) | | | | | | | 4 | | | | | |
| Photocatalyst compound | Titanium oxide 1 (parts by mass) | | | | | | | | | | | |
| | Titanium oxide 2 (parts by mass) | | | | | | | | | | | |
| | Titanium oxide 3 (parts by mass) | 0.10 | 0.15 | 0.20 | 0.50 | 1.00 | | | | | | |
| Titanium oxide 4 (parts by mass) | | | | | | | 0.05 | 0.10 | 0.15 | 0.20 | 0.50 | 1.00 |
| Curing properties | Curing start time (s) | 8 | 7 | 7 | 7 | 7 | 8 | 8 | 8 | 8 | 8 | 8 |
| | Cured coating diameter (mm) | 12 | 11 | 10 | 10 | 10 | 10 | 9 | 13 | 12 | 10 | 10 |

In Table 2,
Titanium oxide 1: anatase-type titanium oxide; purity, 98.9%; average particle size, 9 nm; specific surface area, 309.8 m$^2$/g
Titanium oxide 2: anatase-type titanium oxide; purity, 98.9%; average particle size, 12 nm; specific surface area, 159.5 m$^2$/g
Titanium oxide 3: anatase-type titanium oxide; purity, 85.1%; average particle size, 10 nm; specific surface area, 100 m$^2$/g (surface treated with silica and alumina)
Titanium oxide 4: rutile-type titanium dioxide; purity, 97.5%; average particle size, 16 nm; specific surface area, 100 m$^2$/g Examples 37 to 70; Comparative Example 8

[Preparation of Ink Composition and Evaluation of Curability]

Fifty-five parts by mass of Varnish 1, 25 parts by mass of soybean oil, 17 parts by mass of a coloring pigment (indigo pigment), and a composite of a metal compound shown in Table 3 and Titanium oxide 1 in an amount shown in Table 3 (parts by mass, in terms of metal compound content and titanium oxide (photocatalyst compound) content in ink composition) were combined and mixed together to prepare ink compositions of Examples 37 to 70.

The composite of each metal compound shown in Table 3 and Titanium oxide 1 was formed by dry mixing the metal compound shown in Table 3 and Titanium oxide 1.

Fifty-five parts by mass of Varnish 1, 25 parts by mass of soybean oil, and 17 parts by mass of a coloring pigment (indigo pigment) were combined and mixed together to prepare an ink composition of Comparative Example 8 (the same as the ink composition of Comparative Example 1).

The results of evaluation of curability upon plasma irradiation of the ink compositions of Examples 37 to 70 and Comparative Example 8 are also shown in Table 3.

The evaluation of curability was performed by the same measurement method under the same plasma irradiation conditions as in Examples 1 to 18.

TABLE 3

| | | Example | | | | | | | | | | | | | |
|---|---|---|---|---|---|---|---|---|---|---|---|---|---|---|
| | | 37 | 38 | 39 | 40 | 41 | 42 | 43 | 44 | 45 | 46 | 47 | 48 | 49 | 50 |
| Plasma irradiation distance (mm) | | 4 | | | | | | | | | | | | | |
| Titanium oxide 1 (parts by mass) | | 0.200 | | | | | | | | | | | | | |
| Metal component (parts by mass) | Copper oxide 1 | — | 0.002 | 0.01 | 0.05 | | | | | | | | | | |
| | Copper oxide 2 | — | | | | 0.00 | 0.01 | 0.05 | | | | | | | |
| | Cuprous oxide 1 | — | | | | | | | 0.00 | 0.01 | 0.05 | | | | |
| | Cuprous oxide 2 | — | | | | | | | | | | 0.00 | 0.01 | 0.05 | |
| | Copper bromide | — | | | | | | | | | | | | | 0.00 |
| | Aluminum oxide 1 | — | | | | | | | | | | | | | |
| | Aluminum oxide 2 | — | | | | | | | | | | | | | |
| | Copper oxide composite catalyst 1 | — | | | | | | | | | | | | | |
| | Copper oxide composite catalyst 2 | — | | | | | | | | | | | | | |
| | Copper oxide composite catalyst 3 | — | | | | | | | | | | | | | |
| | Nickel powder | — | | | | | | | | | | | | | |
| Curing properties | Curing start time (s) | 5 | 5 | 5 | 5 | 5 | 5 | 5 | 4 | 4 | 3 | 2 | 2 | 2 | 4 |
| | Cured coating diameter (mm) | 8 | 8 | 9 | 8 | 8 | 8 | 8 | 9 | 8 | 9 | 8 | 9 | 8 | 8 |

| | | Example | | | | | | | | | | |
|---|---|---|---|---|---|---|---|---|---|---|---|---|
| | | 51 | 52 | 53 | 54 | 55 | 56 | 57 | 58 | 59 | 60 | 61 | 62 |
| Plasma irradiation distance (mm) | | 4 | | | | | | | | | | | |
| Titanium oxide 1 (parts by mass) | | 0.200 | | | | | | | | | | | |
| Metal component (parts by mass) | Copper oxide 1 | | | | | | | | | | | | |
| | Copper oxide 2 | | | | | | | | | | | | |
| | Cuprous oxide 1 | | | | | | | | | | | | |
| | Cuprous oxide 2 | | | | | | | | | | | | |
| | Copper bromide | 0.01 | 0.05 | | | | | | | | | | |
| | Aluminum oxide 1 | | | 0.00 | 0.01 | 0.05 | | | | | | | |
| | Aluminum oxide 2 | | | | | | 0.00 | 0.01 | 0.05 | | | | |
| | Copper oxide composite catalyst 1 | | | | | | | | | 0.00 | 0.01 | 0.05 | |
| | Copper oxide composite catalyst 2 | | | | | | | | | | | | 0.00 |
| | Copper oxide composite catalyst 3 | | | | | | | | | | | | |
| | Nickel powder | | | | | | | | | | | | |

TABLE 3-continued

| Curing properties | Curing start time (s) | 4 | 3 | 4 | 4 | 3 | 4 | 4 | 3 | 4 | 4 | 4 | 5 |
|---|---|---|---|---|---|---|---|---|---|---|---|---|---|
| | Cured coating diameter (mm) | 8 | 8 | 8 | 10 | 9 | 10 | 8 | 9 | 10 | 10 | 10 | 8 |

| | | Example | | | | | | | | Comparative Example |
|---|---|---|---|---|---|---|---|---|---|---|
| | | 63 | 64 | 65 | 66 | 67 | 68 | 69 | 70 | 8 |
| Plasma irradiation distance (mm) | | | | | | 4 | | | | |
| Titanium oxide 1 (parts by mass) | | | | | | 0.200 | | | | |
| Metal component (parts by mass) | Copper oxide 1 | | | | | | | | | — |
| | Copper oxide 2 | | | | | | | | | — |
| | Cuprous oxide 1 | | | | | | | | | — |
| | Cuprous oxide 2 | | | | | | | | | — |
| | Copper bromide | | | | | | | | | — |
| | Aluminum oxide 1 | | | | | | | | | — |
| | Aluminum oxide 2 | | | | | | | | | — |
| | Copper oxide composite catalyst 1 | | | | | | | | | — |
| | Copper oxide composite catalyst 2 | 0.01 | 0.03 | | | | | | | — |
| | Copper oxide composite catalyst 3 | | | 0.00 | 0.01 | 0.03 | | | | — |
| | Nickel powder | | | | | | 0.00 | 0.01 | 0.03 | — |
| Curing properties | Curing start time (s) | 3 | 2 | 2 | 2 | 1 | 5 | 2 | 2 | 8 |
| | Cured coating diameter (mm) | 11 | 11 | 10 | 9 | 10 | 8 | 9 | 9 | 9 |

In Table 3,

Copper oxide 1: purity, 96.70%; D10=18.5 µm; specific surface area, 21.5 m²/g

Copper oxide 2: purity, 96%; D10=0.5 µm; specific surface area, 28.6 m²/g

Cuprous oxide 1: purity, 98.50%; D10=1.3 µm; specific surface area, 0.8 m²/g

Cuprous oxide 2: purity, 95.4%; specific surface area, 36 m²/g

Copper bromide: Cu:Br=44.4%:55%

Aluminum oxide 1: particle size, 0.7 µm; specific surface area, 7.5 m²/g; amorphous silica≤0.2 wt %; aluminum oxide≥99.5 wt %; iron oxide≤0.3 wt %

Aluminum oxide 2: particle size, 10 µm; specific surface area, 1.5 m²/g; amorphous silica≤0.2 wt %; aluminum oxide≥99.5 wt %; iron oxide≤0.3 wt %

Copper oxide catalyst 1: specific surface area, 85 m²/g; CuO, 48 wt %; CaO, 15 wt %; SiO₂, 35 wt %

Copper oxide catalyst 2: specific surface area, 134 m²/g; CuO, 56 wt %; SiO₂, 4 wt %; ZrO₂, 39 wt %

Copper oxide catalyst 3: specific surface area, 85 m²/g; CuO, 48 wt %; CaO, 15 wt %; SiO₂, 35 wt %; Fe₂O₃, 30 wt %; Al₂O₃, 7 wt %

Nickel powder: specific surface area, 222 m²/g

Examples 71 to 95, Comparative Examples 9 to 32

[Preparation of Ink Composition and Evaluation of Curability]

Fifty-five parts by mass of Varnish 1, 25 parts by mass of soybean oil, 17 parts by mass of a coloring pigment (indigo pigment), and a composite of a metallic soap and a photocatalyst compound (composite of naphthenic soap and Titanium oxide 1) in an amount shown in Table 4 (parts by mass, in terms of metallic soap-derived metal content (net metal content) and photocatalyst compound content in ink composition) were combined and mixed together to prepare ink compositions of Examples 71 to 95.

The composite of each metallic soap and Titanium oxide 1 was formed by mixing a melt of the metallic soap shown in Table 4 with Titanium oxide 1.

Fifty-five parts by mass of Varnish 1, 25 parts by mass of soybean oil, 17 parts by mass of a coloring pigment (indigo pigment), and naphthenic soap as a metallic soap in an amount shown in Table 5 (parts by mass, in terms of metallic soap-derived metal content (net metal content) in ink composition) were combined and mixed together to prepare ink compositions of Comparative Examples 9 to 32.

The results of evaluation of curability upon plasma irradiation of the ink compositions of Examples 71 to 95 and Comparative Examples 9 to 32 are also shown in Tables 4 and 5.

The evaluation of curability was performed by the same measurement method under the same plasma irradiation conditions as in Examples 1 to 18.

TABLE 4

| | Example | | | | | | | | | | | | | |
|---|---|---|---|---|---|---|---|---|---|---|---|---|---|---|
| | 71 | 72 | 73 | 74 | 75 | 76 | 77 | 78 | 79 | 80 | 81 | 82 | 83 | 84 |
| Plasma irradiation distance (mm) | | | | | | | | 4 | | | | | | |
| Titanium oxide (parts by mass) | 0.2 | 0.2 | 0.2 | 0.2 | 0.2 | 0.2 | 0.2 | 0.2 | 0.2 | 0.2 | 0.2 | 0.2 | 0.2 | 0.2 |

TABLE 4-continued

| | | | | | | | | | | | | | | |
|---|---|---|---|---|---|---|---|---|---|---|---|---|---|---|
| Metallic soap (metal content) (parts by mass) | Mn | 0.002 | 0.01 | 0.03 | | | | | | | | | | |
| | Co | | | | 0.002 | 0.01 | 0.03 | | | | | | | |
| | Zr | | | | | | | 0.002 | 0.01 | 0.03 | | | | |
| | Ca | | | | | | | | | | 0.002 | 0.01 | 0.03 | |
| | Zn | | | | | | | | | | | | | 0.002 |
| | Ba | | | | | | | | | | | | | |
| | Pb | | | | | | | | | | | | | |
| | Cu | | | | | | | | | | | | | |
| Curing start time (s) | | 5 | 5 | 5 | 5 | 5 | 5 | 5 | 4 | 4 | 3 | 5 | 5 | 5 | 4 |
| Cured coating diameter (mm) | | 8 | 7 | 7 | 6 | 9 | 9 | 9 | 10 | 9 | 10 | 10 | 10 | 10 | 9 |

| | | Example | | | | | | | | | | |
|---|---|---|---|---|---|---|---|---|---|---|---|---|
| | | 85 | 86 | 87 | 88 | 89 | 90 | 91 | 92 | 93 | 94 | 95 |
| Plasma irradiation distance (mm) | | | | | | 4 | | | | | | |
| Titanium oxide (parts by mass) | | 0.2 | 0.2 | 0.2 | 0.2 | 0.2 | 0.2 | 0.2 | 0.2 | 0.2 | 0.2 | 0.2 |
| Metallic soap (metal content) (parts by mass) | Mn | | | | | | | | | | | |
| | Co | | | | | | | | | | | |
| | Zr | | | | | | | | | | | |
| | Ca | | | | | | | | | | | |
| | Zn | 0.01 | 0.03 | | | | | | | | | |
| | Ba | | | 0.002 | 0.01 | 0.03 | | | | | | |
| | Pb | | | | | | 0.002 | 0.01 | 0.03 | | | |
| | Cu | | | | | | | | | 0.002 | 0.01 | 0.03 |
| Curing start time (s) | | 2 | 1 | 5 | 5 | 5 | 4 | 3 | 3 | 3 | 1 | 1 |
| Cured coating diameter (mm) | | 9 | 9 | 7 | 7 | 7 | 8 | 10 | 10 | 9 | 8 | 8 |

TABLE 5

| | | Comparative Example | | | | | | | | | | | | |
|---|---|---|---|---|---|---|---|---|---|---|---|---|---|---|
| | | 9 | 10 | 11 | 12 | 13 | 14 | 15 | 16 | 17 | 18 | 19 | 20 | 21 |
| Plasma irradiation distance (mm) | | | | | | | | 4 | | | | | | |
| Titanium oxide (parts by mass) | | — | — | — | — | — | — | — | — | — | — | — | — | — |
| Metallic soap (metal content) (parts by mass) | Mn | — | 0.002 | 0.01 | 0.03 | | | | | | | | | |
| | Co | — | | | | 0.002 | 0.01 | 0.03 | | | | | | |
| | Zr | — | | | | | | | 0.002 | 0.01 | 0.03 | | | |
| | Ca | — | | | | | | | | | | 0.002 | 0.01 | 0.03 |
| | Zn | — | | | | | | | | | | | | |
| | Ba | — | | | | | | | | | | | | |
| | Pb | — | | | | | | | | | | | | |
| | Cu | — | | | | | | | | | | | | |
| Curing start time (s) | | 8 | 8 | 8 | 8 | 7 | 7 | 7 | 8 | 7 | 7 | 8 | 8 | 8 |
| Cured coating diameter (mm) | | 9 | 10 | 9 | 10 | 12 | 8 | 7 | 7 | 8 | 10 | 11 | 10 | 7 |

| | | Comparative Example | | | | | | | | | | |
|---|---|---|---|---|---|---|---|---|---|---|---|---|
| | | 22 | 23 | 24 | 25 | 26 | 27 | 28 | 29 | 30 | 31 | 32 |
| Plasma irradiation distance (mm) | | | | | | 4 | | | | | | |
| Titanium oxide (parts by mass) | | — | — | — | — | — | — | — | — | — | — | — |
| Metallic soap (metal content) (parts by mass) | Mn | | | | | | | | | | | |
| | Co | | | | | | | | | | | |
| | Zr | | | | | | | | | | | |
| | Ca | | | | | | | | | | | |
| | Zn | 0.002 | 0.01 | 0.03 | | | | | | | | |
| | Ba | | | | 0.002 | 0.01 | 0.03 | | | | | |
| | Pb | | | | | | | 0.002 | 0.01 | | | |
| | Cu | | | | | | | | | 0.002 | 0.01 | 0.03 |

TABLE 5-continued

| | | | | | | | | | | | |
|---|---|---|---|---|---|---|---|---|---|---|---|
| Curing start time (s) | 8 | 7 | 7 | 8 | 8 | 8 | 7 | 7 | 8 | 7 | 7 |
| Cured coating diameter (mm) | 9 | 10 | 9 | 9 | 9 | 10 | 8 | 9 | 9 | 9 | 9 |

Examples 96 to 118

[Preparation of Ink Composition and Evaluation of Curability]

Fifty-five parts by mass of Varnish 1, 25 parts by mass of soybean oil, 17 parts by mass of a coloring pigment (indigo pigment), and a composite of a metallic soap and a photocatalyst compound (composite of naphthenic soap and Titanium oxide 1) in an amount shown in Table 6 (parts by mass, in terms of metallic soap-derived metal content (net metal content) and photocatalyst compound content in ink composition) were combined and mixed together to prepare ink compositions of Examples 96 to 118.

The composite of each metallic soap and Titanium oxide 1 was formed by mixing a melt of the metallic soap shown in Table 6 with Titanium oxide 1.

The results of evaluation of curability upon plasma irradiation of the ink compositions of Examples 96 to 118 are also shown in Table 6.

The evaluation of curability was performed as follows: 0.1 cc of each ink composition was transferred onto a polypropylene film (Polysame PC-8162 manufactured by Sekisui Seikei Co., Ltd.) with an RI color transfer machine, and using a remote-type plasma generation device, the color-transferred surface was irradiated with a plasma under the following irradiation conditions.

(Plasma Irradiation Conditions)
Gas species: air
Flow rate: 5 l/min
Irradiation port diameter: 1 mm
Irradiation distance: 7 mm The color-transferred surface of each ink composition was irradiated with a plasma for 1 to 20 seconds at one-second intervals. For each case, the color-transferred surface was rubbed with absorbent cotton to wipe off an uncured ink composition, and a plasma-curing start time and a cured coating diameter of a circularly cured part at the plasma-curing start time were measured.

In Examples 96 to 118, to make the grades of coating curability distinct from each other, the plasma treating power was intentionally reduced by setting the irradiation distance to 7 mm.

TABLE 6

| | | Example | | | | | | | | | | | |
|---|---|---|---|---|---|---|---|---|---|---|---|---|---|
| | | 96 | 97 | 98 | 99 | 100 | 101 | 102 | 103 | 104 | 105 | 106 | 107 | 108 |
| Plasma irradiation distance (mm) | | | | | | | 7 | | | | | | | |
| Titanium oxide (parts by mass) | | | | | | | 0.2 | | | | | | | |
| Metallic soap (metal content) (parts by mass) | Mn | 0.01 | | | | | | | | 0.002 | 0.01 | | | |
| | Co | | 0.01 | | | | | | | | | 0.002 | 0.01 | |
| | Zr | | | 0.01 | | | | | | | | | | 0.002 |
| | Ca | | | | 0.01 | | | | | | | | | |
| | Ba | | | | | 0.01 | | | | | | | | |
| | Pb | | | | | | 0.01 | | | | | | | |
| | Zn | | | | | | | 0.01 | | | | | | |
| | Cu | | | | | | | | 0.01 | 0.01 | 0.01 | 0.01 | 0.01 | 0.01 |
| Curing start time (s) | | 14 | 14 | 12 | 14 | 14 | 12 | 11 | 11 | 10 | 7 | 8 | 7 | 8 |
| Cured coating diameter (mm) | | 10 | 10 | 10 | 9 | 8 | 10 | 10 | 10 | 11 | 8 | 10 | 8 | 10 |

| | | Example | | | | | | | | | |
|---|---|---|---|---|---|---|---|---|---|---|---|
| | | 109 | 110 | 111 | 112 | 113 | 114 | 115 | 116 | 117 | 118 |
| Plasma irradiation distance (mm) | | | | | | 7 | | | | | |
| Titanium oxide (parts by mass) | | | | | | 0.2 | | | | | |
| Metallic soap (metal content) (parts by mass) | Mn | | | | | | | | | | — |
| | Co | | | | | | | | | | — |
| | Zr | 0.01 | | | | | | | | | — |
| | Ca | | 0.002 | 0.01 | | | | | | | — |
| | Ba | | | | 0.002 | 0.01 | | | | | — |
| | Pb | | | | | | 0.002 | 0.01 | | | — |
| | Zn | | | | | | | | 0.002 | 0.01 | — |
| | Cu | 0.01 | 0.01 | 0.01 | 0.01 | 0.01 | 0.01 | 0.01 | 0.01 | 0.01 | — |
| Curing start time (s) | | 7 | 9 | 6 | 9 | 8 | 7 | 6 | 8 | 7 | 15 |
| Cured coating diameter (mm) | | 9 | 10 | 10 | 10 | 11 | 8 | 11 | 10 | 11 | 10 |

Examples 119 to 142, Comparative Examples 33 to 56

[Preparation of Ink Composition and Evaluation of Curability]

Fifty-five parts by mass of Varnish 1, 25 parts by mass of soybean oil, 17 parts by mass of a coloring pigment (indigo pigment), and a composite of a copper metallic soap and a photocatalyst compound (composite of copper naphthenate and Titanium oxide 1) in an amount shown in Table 7 (parts by mass, in terms of metallic soap-derived metal content (net copper content) and photocatalyst compound (photocatalyst titanium oxide) content in ink composition) were combined and mixed together to prepare ink compositions of Examples 119 to 125.

The composite of each metallic soap and Titanium oxide 1 was formed by mixing a melt of the copper metallic soap shown in Table 7 with Titanium oxide 1.

Fifty-five parts by mass of Varnish 1, 25 parts by mass of soybean oil, 17 parts by mass of a coloring pigment (indigo pigment), and photocatalyst titanium oxide as a photocatalyst compound in an amount shown in Table 7 (parts by mass) were combined and mixed together to prepare an ink composition of Example 126.

Fifty-five parts by mass of Varnish 1, 25 parts by mass of soybean oil, and 17 parts by mass of a coloring pigment (indigo pigment) were combined and mixed together to prepare an ink composition of Comparative Example 33.

Fifty-five parts by mass of Varnish 1, 25 parts by mass of soybean oil, 17 parts by mass of a coloring pigment (indigo pigment), and copper naphthenate as a metallic soap in an amount shown in Table 7 (parts by mass, in terms of metallic soap-derived metal content (net metal content; net copper content) in ink composition) were combined and mixed together to prepare ink compositions of Comparative Examples 34 to 40.

The results of evaluation of curability upon plasma irradiation of the ink compositions of Examples 119 to 126 and Comparative Examples 33 to 40 are also shown in Table 7.

Ink compositions of Examples 127 to 134 and Comparative Examples 41 to 48 were prepared at compositional ratios shown in Table 8 in the same manner as in Examples 119 to 126 and Comparative Examples 33 to 40 except that the soybean oil was replaced with tung oil. The results of evaluation of curability upon plasma irradiation are also shown.

Ink compositions of Examples 135 to 142 and Comparative Examples 49 to 56 were prepared at compositional ratios shown in Table 9 in the same manner as in Examples 119 to 126 and Comparative Examples 33 to 40 except that the soybean oil was replaced with castor oil. The results of evaluation of curability upon plasma irradiation are also shown.

The evaluation of curability was performed by the same measurement method under the same plasma irradiation conditions as in Examples 96 to 118.

TABLE 7

| | | Example | | | | | | | | Comparative Example | | | | | | | |
|---|---|---|---|---|---|---|---|---|---|---|---|---|---|---|---|---|---|
| | | 119 | 120 | 121 | 122 | 123 | 124 | 125 | 126 | 33 | 34 | 35 | 36 | 37 | 38 | 39 | 40 |
| Plasma irradiation distance (mm) | | | | | | | | | 7 | | | | | | | | |
| Amount of titanium oxide added (parts by mass) | | | | | 0.2 | | | | | | — | | | | | | |
| Amount of metal added (parts by mass) | | 0.002 | 0.01 | 0.03 | 0.06 | 0.1 | 0.2 | 0.4 | — | — | 0.002 | 0.01 | 0.03 | 0.06 | 0.1 | 0.2 | 0.4 |
| Soybean oil | Curing start time (s) | 13 | 11 | 11 | 11 | 10 | 10 | 12 | 15 | 20 | 20 | 20 | 19 | 19 | 18 | 17 | 23 |
| | Cured diameter (mm) | 9 | 9 | 9 | 9 | 9 | 8 | 8 | 10 | 10 | 10 | 11 | 10 | 10 | 10 | 10 | 10 |

TABLE 8

| | | Example | | | | | | | | Comparative Example | | | | | | | |
|---|---|---|---|---|---|---|---|---|---|---|---|---|---|---|---|---|---|
| | | 127 | 128 | 129 | 130 | 131 | 132 | 133 | 134 | 41 | 42 | 43 | 44 | 45 | 46 | 47 | 48 |
| Plasma irradiation distance (mm) | | | | | | | | | 7 | | | | | | | | |
| Amount of titanium oxide added (parts by mass) | | | | | 0.2 | | | | | | — | | | | | | |
| Amount of metal added (parts by mass) | | 0.002 | 0.01 | 0.03 | 0.06 | 0.1 | 0.2 | 0.4 | — | — | 0.002 | 0.01 | 0.03 | 0.06 | 0.1 | 0.2 | 0.4 |
| Tung oil | Curing start time (s) | 5 | 5 | 5 | 5 | 5 | 5 | 5 | 6 | 11 | 11 | 11 | 11 | 9 | 8 | 6 | 6 |
| | Cured diameter (mm) | 8 | 9 | 9 | 8 | 8 | 9 | 9 | 8 | 10 | 10 | 10 | 10 | 10 | 10 | 12 | 12 |

TABLE 9

|  | | Example | | | | | | | | Comparative Example | | | | | | | |
|---|---|---|---|---|---|---|---|---|---|---|---|---|---|---|---|---|---|
|  | | 135 | 136 | 137 | 138 | 139 | 140 | 141 | 142 | 49 | 50 | 51 | 52 | 53 | 54 | 55 | 56 |
| Plasma irradiation distance (mm) | | | | | | | | | | 7 | | | | | | | |
| Amount of titanium oxide added (parts by mass) | | | | | 0.2 | | | | | | | — | | | | | |
| Amount of metal added (parts by mass) | | 0.002 | 0.01 | 0.03 | 0.06 | 0.1 | 0.2 | 0.4 | — | — | 0.002 | 0.01 | 0.03 | 0.06 | 0.1 | 0.2 | 0.4 |
| Castor oil | Curing start time (s) | 7 | 7 | 7 | 6 | 6 | 9 | 6 | 7 | 13 | 13 | 13 | 13 | 13 | 12 | 12 | 13 |
|  | Cured diameter (mm) | 9 | 9 | 9 | 8 | 9 | 9 | 10 | 9 | 11 | 11 | 11 | 11 | 11 | 12 | 13 | 13 |

As shown in Tables 1 to 9, by using a photocatalyst compound and/or a composite of a metal component and a photocatalyst compound as a constituent component of the ink composition for plasma curing, the dry-curing start time can be made earlier. In addition, the dry-curability can also be improved (the dry-cured coating diameter can be increased).

As shown in Tables 1 and 2, by using a photocatalyst compound as a constituent component of the ink composition for plasma curing, the dry-curing start time can be made much earlier than when a non-photocatalyst compound (rutile-type titanium dioxide) is used and when no photocatalyst components are used. In addition, the dry-curability can also be improved (the dry-cured coating diameter can be increased).

As shown in Tables 3 to 9, by using a composite of a metal component and a photocatalyst compound as a constituent component of the ink composition for plasma curing, the dry-curing start time can be made much earlier than when a metal component is used alone and when neither a metal component nor a photocatalyst compound is used. In addition, the dry-curability can also be improved (the dry-cured coating diameter can be increased).

Particularly in the soybean oil-containing ink compositions having lowest curability, the effect related to improvement in dry-curing start time and dry-curability (increase in dry-cured coating diameter) is markedly produced by using a photocatalyst compound and/or a composite of a metal component and a photocatalyst compound as a curing accelerator.

The invention claimed is:

1. An ink composition for plasma curing, comprising:
    a composite of (i) a metal component which is one or more components selected from the group consisting of a metal, a metal oxide, and a metallic soap, and (ii) a photocatalyst compound which includes titanium oxide and/or zinc oxide, wherein the metal oxide is one or more oxides selected from the group consisting of tungsten oxide, copper oxide, cuprous oxide, iron oxide, calcium oxide, silicon oxide, and aluminum oxide; and
    an animal or vegetable oil and/or an animal or vegetable oil derivative.

2. The ink composition for plasma curing according to claim 1, further comprising a binder.

3. The ink composition for plasma curing according to claim 1, wherein the animal or vegetable oil and/or the animal or vegetable oil derivative is an animal or vegetable oil and/or an animal or vegetable oil derivative having an iodine value of 80 or more.

* * * * *